United States Patent [19]

Shikama

[11] Patent Number: 5,285,287
[45] Date of Patent: Feb. 8, 1994

[54] PROJECTING METHOD FOR PICTURE DISPLAY APPARATUS

[75] Inventor: Shinsuke Shikama, Nagaokakyo, Japan

[73] Assignee: Mitsubishi Denki Kabushiki Kaisha, Tokyo, Japan

[21] Appl. No.: 892,286

[22] Filed: Jun. 2, 1992

[30] Foreign Application Priority Data

Jun. 14, 1991 [JP] Japan ................... 3-143170
Aug. 7, 1991 [JP] Japan ................... 3-197690

[51] Int. Cl.[5] ............ H04N 5/74; H04N 9/31
[52] U.S. Cl. .................... 348/745; 348/766
[58] Field of Search ......... 358/60, 63, 64, 93, 358/231, 237, 236, 248, 254, 255; 359/443; 353/47, 71, 72, 74, 119; H04N 9/31, 5/74

[56] References Cited

U.S. PATENT DOCUMENTS 5,097,323  3/1992  Sato et al. ................... 358/60

FOREIGN PATENT DOCUMENTS 0182979  7/1988  Japan ............... H04N 5/74
0220681  9/1988  Japan ............... H04N 5/74
1-120192  5/1989  Japan .
1-115778  8/1989  Japan .
0201787  9/1991  Japan ............... H04N 9/31

OTHER PUBLICATIONS

"Field Controlled Light Scattering from Nematic Microdroplets," Doane et al., 1986 American Institute of Physics, pp. 269-271, vol. 48, No. 4, Jan. 27, 1986.

Primary Examiner—James J. Groody
Assistant Examiner—Michael H. Lee
Attorney, Agent, or Firm—Birch, Stewart, Kolasch & Birch

[57] ABSTRACT

A projection display device capable of selectively operating in a front projection mode and a rear projection mode, comprises a projector (300) disposed in a cabinet, a rear projection screen formed in a wall of the cabinet, and a front projection screen disposed outside the cabinet. To permit selection between the front and rear projections, the projector may be detachably mounted on the cabinet: when it is mounted the image rays (110) are introduced into the cabinet for the rear projection, while when it is detached it can be used for the front projection. In another embodiment, a selective light guide directs the image rays either to the rear projection screen or to the front projection screen. In a further embodiment, the rear projection screen can change between transparent and translucent states. When it is transparent, the image rays are passed therethrough to the front projection screen.

89 Claims, 21 Drawing Sheets

PROJECTING METHOD FOR PICTURE DISPLAY APPARATUS

BACKGROUND OF THE INVENTION

The present invention relates to a projection display device which permits selective implementation of two projection methods, a rear projection method and a front projection method.

FIG. 19 illustrates a prior art front projection display device comprising as described, for example, in Japanese Patent Kokai Publication No. 120192/1989.

A projector 300 is mounted on a suitable table or mount 175 facing a reflecting, front projection screen 5F, and image rays 110 from the projector 300 are projected on the screen 5F, to display an enlarged picture. An observer 400 faces the front projection screen 5F on the same side as the side on which the image rays 110 from the projector 300 are projected, and sees the displayed picture. Since the observer 400 sees the picture on the same side as the side on which the image rays 110 are projected, the method implemented by the arrangement of FIG. 19 is called a front projection method.

Details of the projector is shown in FIG. 21. As illustrated, it comprises a light source 1 comprising a lamp 120 and parabolic mirror 130 that directs white light 2 toward dichroic mirrors 14B and 14G. The projector 300 also comprises mirrors 11a, 11b and 11c, liquid crystal display panels 3R, 3G and 3B, a dichroic prism 15, a projection lens 4 and a reflecting, front projection screen 5F. The lamp 120 may be a metal halide lamp, xenon lamp, halogen lamp or other white light source. The lamp 120 is at the focal point of the parabolic mirror 130 to produce a collimated beam of white light. The dichroic mirror 14B transmits red and green light, but reflects blue light. The dichroic mirror 14G reflects green light but transmits red light. By means of the dichroic mirrors 14B and 14G, white light 2 is decomposed into three primary colors. The mirrors 11a and 11b reflect red light, the dichroic mirror 14B and the mirror 11c reflect blue light and the dichroic mirror 14G reflects green light. The reflected light is directed to the respective one of the liquid crystal display panels 3R, 3G and 3B, each of which produces a monochromatic image of the respective color, under control of an operating circuit, not shown. The three monochromatic images for the respective colors are combined by the dichroic prism 15 into a single light image of a full color. The above-described elements make up an image-forming device 200.

The lens 4 enlarges the combined image light and projects the enlarged image light 110 onto a large front projection screen 5F. In order to achieve an image of a high quality, it is necessary to control optical aberrations, so the lens 4 is in the form of a compound lens comprising a number of lens elements (not illustrated as such in the drawing). The image is focused by moving some or all of the constituent lens elements of the compound lens 4 parallel to the light axis. The image-forming device 200 and the lens 4 make up a projector 300.

FIG. 20 shows a second example of the prior art described for example in Japanese Utility Model Kokai Publication No. 115778/1989.

This example uses a rear projection method in which the observer sees the displayed picture on the side opposite to the side onto which the image rays 110 are projected.

In this example, the projector 300, similar to the one shown in FIG. 21, a first mirror 150 and second mirror 160, are placed in a cabinet 170, and an enlarged picture is displayed on a translucent, rear projection screen 5R forming part of the wall of the cabinet 170. More specifically, color image rays 110 emitted from the projector 300 follow an optical path through the lens 4, the first mirror 150, and the second mirror 160, are projected, onto the rear projection screen 5R to display an enlarged image. Because of the translucency (semi-transparency) of the screen 5R, the picture can be seen from outside the cabinet 170, i.e., on the side opposite to the side onto which the image rays 110 are projected. The mirrors 150 and 160 are used to lengthen the light path thereby to enable adequate magnification of the image with a given field angle of the lens 4, and within a limited size of the cabinet 170. Since the observer 400 sees the picture on the side opposite to the side on which the image rays 110 are projected, the method implemented by the arrangement of FIG. 20 is called a rear projection method.

The length of the optical path in the front projection method (FIG. 19) is not restricted by the size of the cabinet 170, so the light path, i.e., the projection distance (in FIG. 19 the distance between the lens 4 and the front projection screen 5F) can be made long. Compared with the rear projection method (FIG. 20) the front projection can give a greater magnification of the image displayed on the liquid crystal display panels. However, the front projection is associated with the following problems.

(1) If a person enters the space between the projector 300 and the front projection screen 5F, the projection of the image may be disturbed. Furniture, or the like may also interfere with the projection of the image.

(2) In order to project a picture of a high visibility, the front projection screen 5F is normally made of a highly reflective material. A dark room is therefore required to prevent ambient illumination from washing out dark parts of the picture, causing a loss of contrast. Thus it is difficult to read, do housework or do other chores while watching the displayed picture.

(3) If the front projection screen 5F is near a wall (which in many cases is a convenient position) it may be that, in order to maintain an appropriate distance between the projector 300 and the front projection screen 5F, the projector 300 must be disposed somewhere in the middle of the room, restricting the layout of the room.

Compared with the front projection method, the rear projection method has the following advantages:

(1) The picture is projected from the inside of the cabinet 170 onto the rear side of the rear projection screen 5R, so people or furniture will not obstruct the picture.

(2) The rear projection screen 5R may be provided with black stripes, or the rear projection screen 5R may be made of a material that selectively transmits only the spectral components of the image rays 110, thus providing good contrast in the presence of ambient illumination.

(3) Because of the relatively small size of the cabinet 170, it is easy to find a suitable place against a wall or in a corner that does not spoil the layout of the room.

In the rear projection, the picture size is limited. It can be increased by (1) lengthening the optical path or (2) enlarging the field angle of the lens 4. However the measure (1) will unavoidably lead to increase in the size of the cabinet as well, requiring more space for the installation. The measure (2) requires a large number of lens elements, increasing the price of the picture display device considerably. For obtaining large pictures, the front projection method is superior. The rear projection display devices typically have a diagonal picture size of 40–70 inches, while the front projection typically provides a 60–200 inch diagonal picture.

Thus, the front projection method gives a larger picture but has many limitations with regard to the installation (layout of the room) and illumination. The rear projection method gives a smaller picture but has relatively few limitations with regard to the installation and illumination. In the prior art the user has to choose between the two types of projection devices. Providing both of the two types, of course, is disadvantageous in terms of cost and in requiring more space for the installation.

SUMMARY OF THE INVENTION

An object of the present invention is to provide a projection display device which can be used for both of the front and rear projection methods, and capable of selective implementation of the two methods.

The projection display device according to a first aspect of the invention comprises:
 a projector (300) for emitting image rays (110);
 a cabinet (170);
 a rear projection screen (5R) provided on said cabinet, for receiving image rays on its first surface facing the interior of the cabinet for display on its opposite, second surface in said rear projection mode; and
 a front projection screen (5F) disposed outside said cabinet, for receiving the image rays on one of said surfaces for display on said one of the surfaces in said front projection mode;
 said cabinet having a mounting section (171) formed at a part of said cabinet and for setting said projector at a predetermined position such that when said projector is set in said predetermined position the image rays from said projector travel within said cabinet to the first surface of said rear projection screen.

The projection display device according to a second aspect of the invention comprise:
 a cabinet (170);
 a projector (300) disposed in said cabinet and emitting image rays (110);
 a rear projection screen (5R) provided on said cabinet, for receiving image rays on its first surface facing the interior of said cabinet for display on its opposite, second surface in said rear projection mode;
 a front projection screen (5F) disposed outside said cabinet, for receiving the image rays on one of its surfaces for display on said one of the surfaces in said front projection mode; and
 selective light guide means for guiding image rays from said projector either to said rear projection screen or to said front projection screen.

The projection display device according a third aspect of the invention comprises:
 a cabinet (170);
 a projector (300) disposed in said cabinet and emitting image rays (110);
 a rear projection screen (5R) provided on said cabinet, for receiving image rays on its first surface facing the interior of said cabinet for display on its opposite, second surface in said rear projection mode;
 a front projection screen (5F) disposed outside said cabinet, for receiving the image rays on one of its surfaces for display on said one of the surfaces in said front projection mode;
 said rear projection screen being switchable between a translucent state for projection in said rear projection mode and a transparent state for projection in said front projection mode; and
 switching means for switching said rear projection screen between said translucent state and said transparent state.

DETAILED DESCRIPTION OF THE PREFERRED EMBODIMENTS

Figure 1:
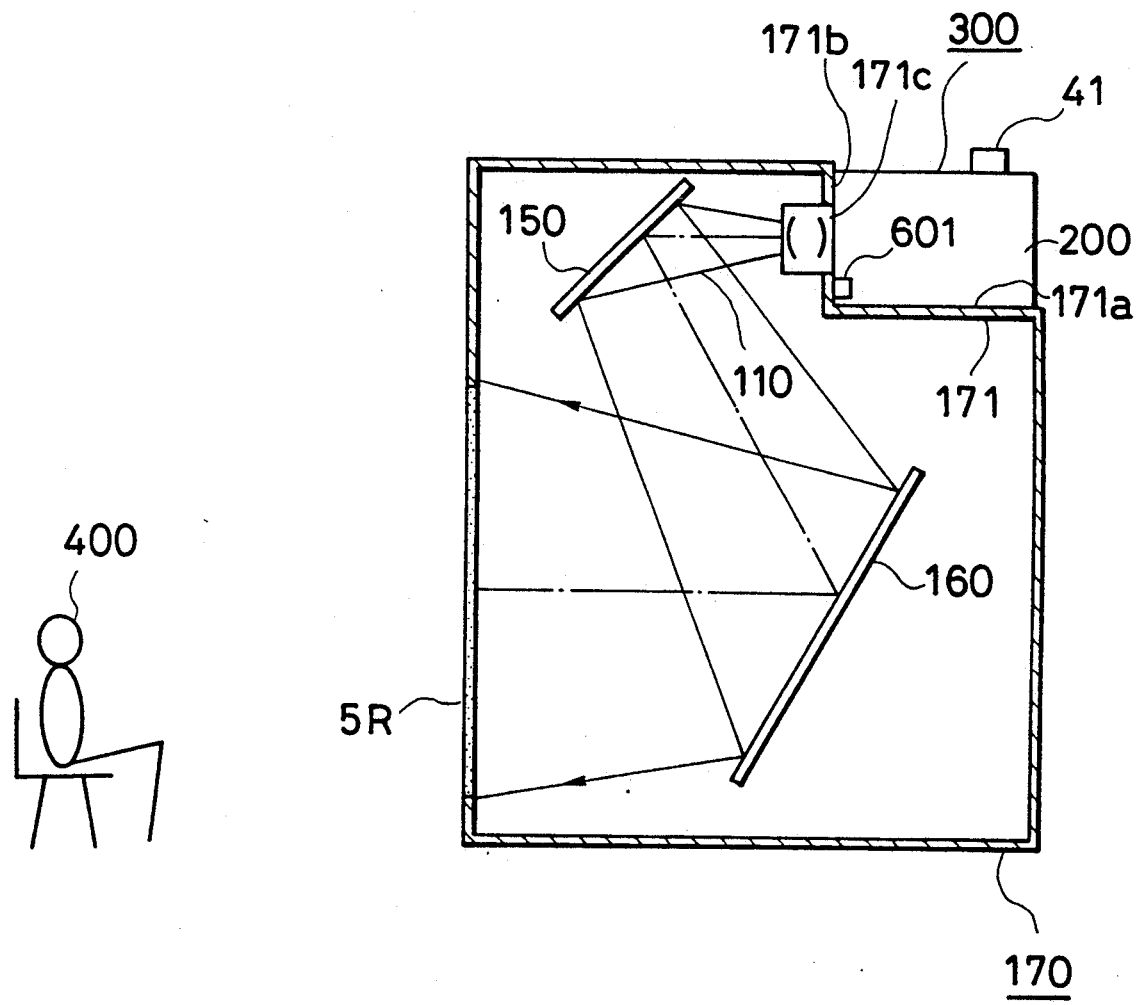
FIG. 1 is a sectional view of a first embodiment of the present invention being used for rear projection.

Embodiments of the invention will now be described with reference to the drawings. In the following description, the members or parts given identical reference numerals are identical or similar in their structure and/or function, and should be so construed unless contrary description is given or unless it contradicts with reasonable interpretation.

FIRST EMBODIMENT

A first embodiment of the invention will now be described with reference to FIG. 1, FIG. 2 and FIG. 3. The projection display device of this embodiment comprises a projector 300, a cabinet 170, two mirrors 150 and 160, a rear projection screen 5R, a front projection screen 5F, and a focus adjusting device 40, as well as a mode selection switch 601, and an image direction control circuit 600.

The projector 300 may be, for example, the same as in the prior art, except that it is additionally provided with the image direction control circuit 600.

Figure 20:
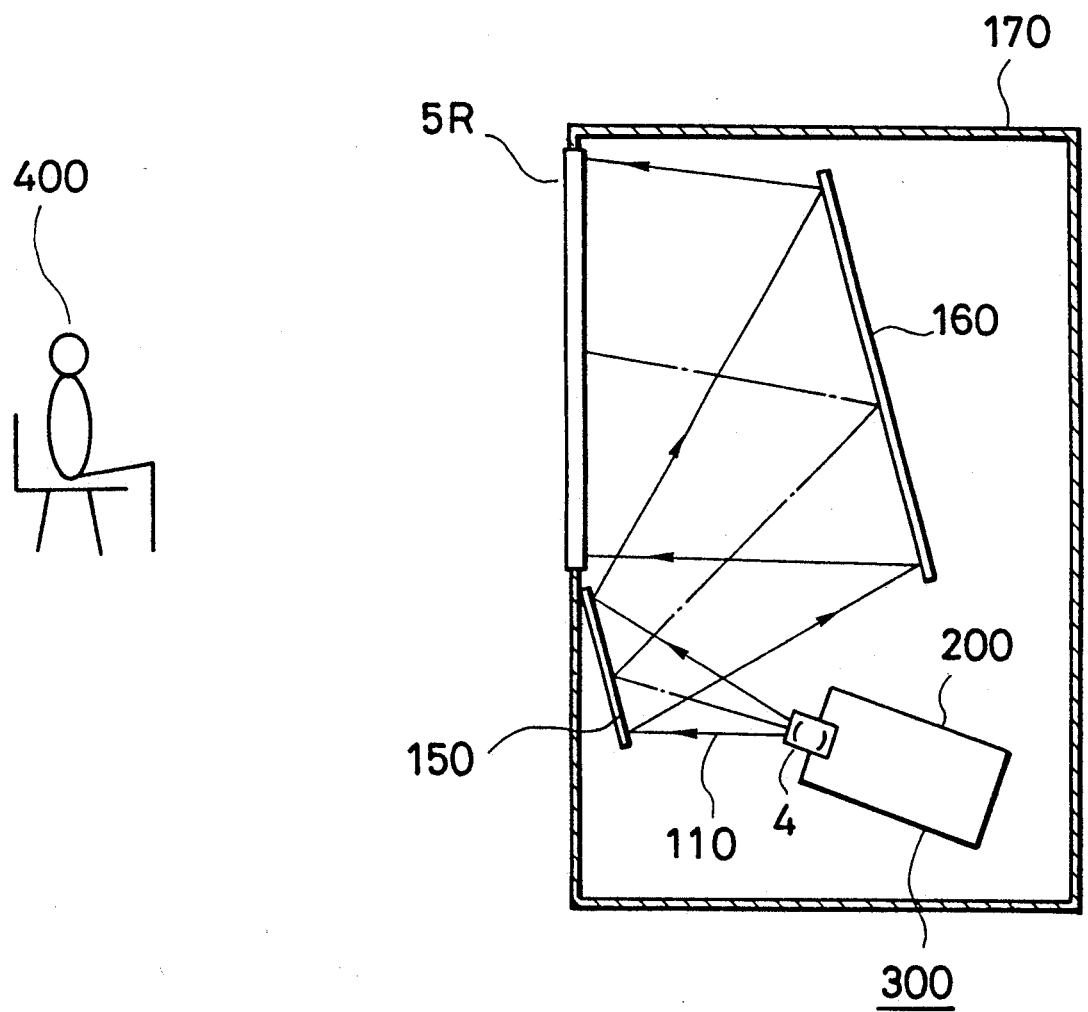
FIG. 20 is a sectional view of a projection display device for rear projection in the prior art.

The cabinet 170 is similar to the cabinet in the prior art of FIG. 20, but is additionally provided with a recessed part 171, forming a mount part, at a shoulder of the cabinet 170, and defined by a horizontal wall 171a and a vertical wall 171b, for permitting mount of the projector 300. The vertical wall 171b has an aperture 171c through which the projection lens 4 of the projector 300 is inserted when the projector 300 is mounted on the mount part 171.

The rear projection screen 5R forms a part of the front wall of the cabinet 170 and is substantially the same as in the prior art of FIG. 20.

Figure 19:
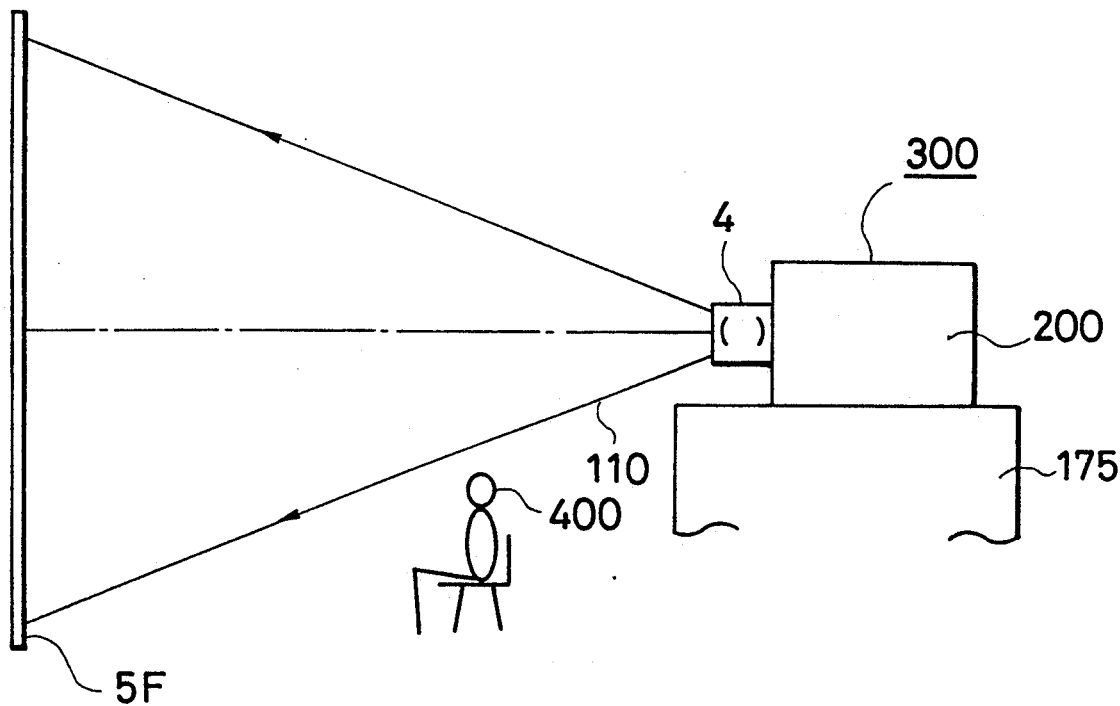
FIG. 19 is a schematic view of a projection display device for front projection in the prior art.

The front projection screen 5F is disposed outside the cabinet 170 and is substantially the same as in the prior art of FIG. 19.

The cabinet 170 is preferably so formed as to block entry of substantially all environmental light into the cabinet 170 to increase the contrast of the image and thereby to improve the visibility of the image in the rear projection mode.

The focus adjusting device 40 comprises a focus adjusting mechanism 42 built in the projector 300, adjacent the projecting lens 4 and a pair of focus adjusting push-button switches 41. One of the push-button switches 41 is used to lengthen the focal distance, and the other of the switches 41 is to shorten the focal distance. The focus adjusting push-button switches 41 of this embodiment are provided on a housing 200 of the projector 300.

The image direction control circuit 600 of this embodiment is built in the projector 300. The image direction control means 600 is used to control the left/right direction of the image to compensate for the difference in the mirror-image effect due to the difference in the projection method, i.e., whether the projected image is seen from the same side as or the opposite side the side on which the image is projected, so that the image as seen on the projection screen (from the observer) is correct as to the left/right direction regardless of whether the rear projection or the front projection is being implemented. The left/right direction may be referred to as scan direction.

The control of the image direction can be achieved by selecting the allocation of the pixel signals to the pixel electrodes of the liquid crystal display panel, or by selecting the direction of the horizontal scanning in the CRT display.

The mode selection switch 601 of this embodiment is in the form of a "microswitch" 601 provided on the housing 200 of the projector 300 and having a sensing member such as a lever 601a, and actuated when the projector 300 is mounted on the mount part 171, and the sensing member 601a is therefore pressed against the vertical wall 171b of the mount part 171. The image direction control circuit 600 is responsive to the state of the microswitch 601 for controlling the left/right direction of the image as produced in the image forming device 20 in the projector 300, e.g., the image as produced in the liquid crystal display panels.

For operation in the rear projection mode, the projector 300 is mounted on the mount part 171, and the projection lens 4 is inserted in the aperture 171c in the vertical wall 171b of the mount part 171, as shown in FIG. 1. The microswitch 601 is then actuated. The image rays 110 emitted from the projector 300 are reflected at the mirror 150 and then at the second mirror 160, and are then projected on the rear projection screen 5R, thus an enlarged image is formed on the inner or rear surface of the rear projection screen 5R.

An observer 400 sees the image on the outer or front surface of the translucent screen 5R, while the image from the projector 300 is projected onto the inner or rear surface of the rear projection screen 5R.

Figure 2:
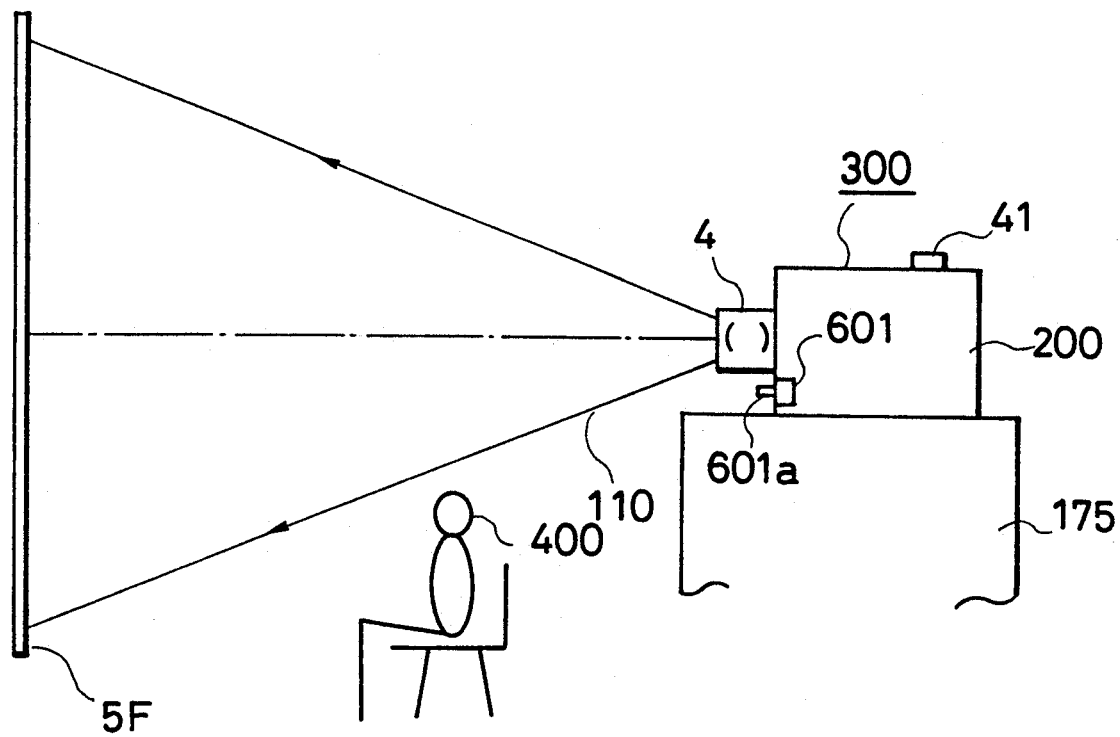
FIG. 2 is a sectional view of the first embodiment being used for front projection.
Figure 3:
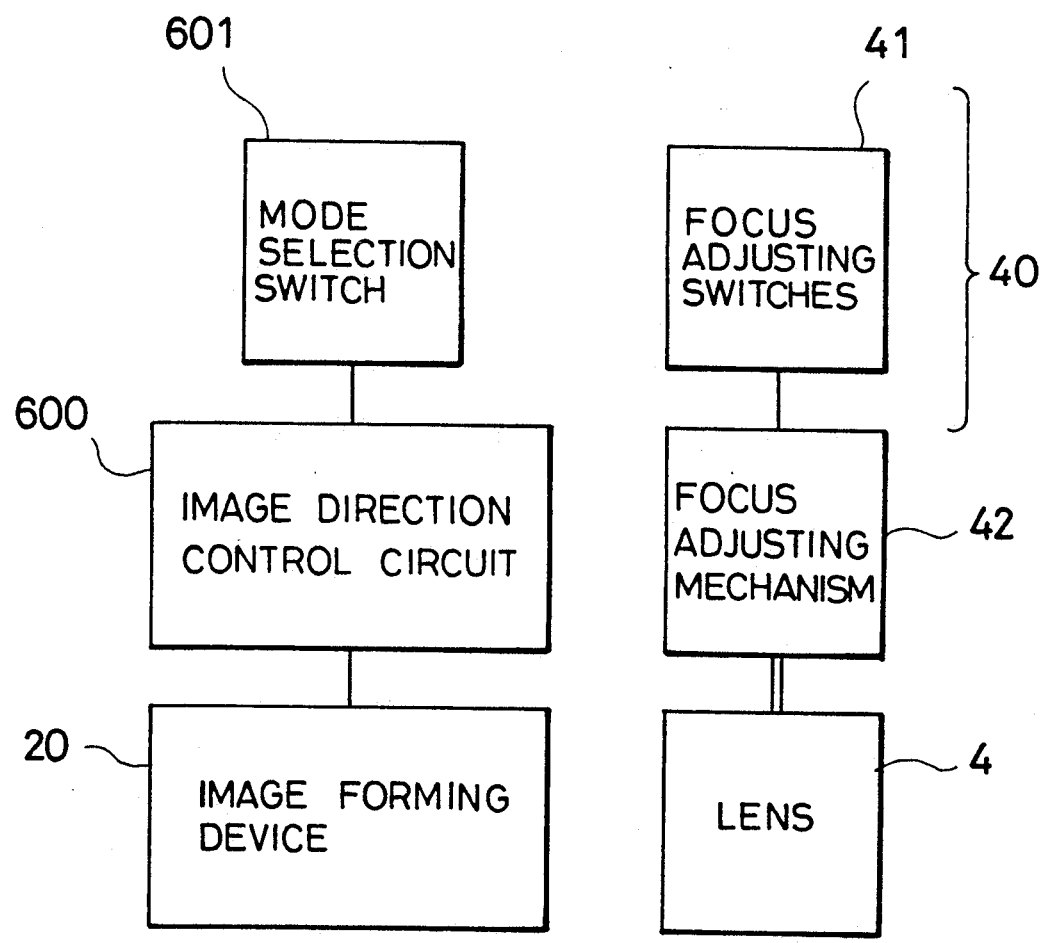
FIG. 3 is a block diagram showing the functional relationship between some of the components of the projection display device of the first embodiment.

For operation in the front projection mode, the projector 300 is removed from the mount part 171, and placed on a suitable mount or table 175, being directed to the front projection screen 5F, as illustrated in FIG. 2. Then, the microswitch 601 is not actuated, and the scanning direction is thereby set in the reverse to be suitable for the front projection.

In this state, the image rays 110 from the projector 300 are projected directly onto the front projection screen 5F, forming an enlarged image on a surface of the front projection screen. The observer 400 sees the enlarged image on the screen 5F on the same side as the image is projected from the projector 300.

As the length of the optical path from the projector 300 to the screen 5F, 5R differs between the front projection and the rear projection, focal distance needs to be varied when the projection method is switched from one to the other of the projection methods. This can be achieved by manipulating the push-button switches 41, responsive to which the focus adjusting mechanism 40 moves the entire projection lens 4, or at least one of the lens elements of the projection lens 4.

Thus, in the first embodiment, the projector 300 is mounted on or removed from the mount part 171 of the cabinet 170 to implement the rear projection or the front projection.

Since the projector 300 is removed from the cabinet 170 in the case of the front projection, restriction on the placement of the projector 300 and the front projection screen 5F is much reduced.

In the first embodiment described, the microswitch is used to detect the mounting or dismounting of the projector 300 onto the mount part 171. Any other means, for instance, an optical detector, or a magnetic detector, can be used for such detection, and supplying the image direction control circuit 600 with a signal indicating the mounting of the projector 300 on the mount part 171.

In a modification of the first embodiment, the projector 300 may be mounted such that it can be moved up and down, and when it is at the down position, the image rays 110 from the projector 300 are introduced into the cabinet 170, reflected by the mirrors 150 and 160, and are projected onto the rear projection screen 5R, while when it is in the up position the image rays 110 from the projector 300 are projected directly onto the front projection screen 5F. Such up and down movement may be achieved by the use of a motor-driven mechanism.

Second Embodiment

A second embodiment of the invention will now be described with reference to FIG. 4, FIG. 5 and FIG. 6. The projection display device of this embodiment comprises a projector 300, a cabinet 170, a reflecting mirror 150, a slidable rear projection screen 5R, a fixing member 612, an envelope 610 formed by fixed panels 610a and 610b, a front projection screen 5F, and a focusing adjusting device 40, as well as a mode selection switch 601, and an image direction control circuit 600.

The projector 300 may be the same as the projector 300 in the first embodiment, except that it is fixed in the cabinet 170, being fixed by a fixture 32, and the mode selection switch 601, which was a microswitch in the first embodiment, is not provided on the projector housing 200, but is provided on the exterior of the cabinet 170, at a position suitable for manual operation, and is a manually-operated switch, and is electrically connected to a control unit 50, which in turn is connected to the image direction control circuit 600 provided in the projector 300.

The cabinet 170 is similar to that of the prior art of FIG. 20 except that the rear projection screen 5R is slidably mounted. It can be slid down and up manually. It can selectively assume a first position in which it forms a surface of the cabinet 170, and closes an opening or window 501 (FIG. 5), as shown in FIG. 4, and a second position in which it has slid down into the envelope 610, opening the window 501, as shown in FIG. 5. In the first position, the rear projection screen 5R has its lower edge positioned at the upper edge of the envelope 610, and its upper edge is held by the fixing member 612, and the window 501 is closed.

The front projection screen 5F is disposed outside the cabinet 170 and is substantially identical to that of the first embodiment.

As in the first embodiment, the focus adjusting device 40 comprises a pair of push-button switches 41 and a focus adjusting mechanism 42. The push-button switches 41 of this embodiment are mounted on the exterior of the cabinet 170, at a position suitable for manual operation, and are manually operated to control the focus adjusting device 40 in the cabinet 170. The focus adjusting mechanism 42 moves the entire lens 4, or lens elements in the lens 4, thereby to adjust the focus of the image onto the rear projection screen 5R or on the front projection screen 5F.

Figure 4:
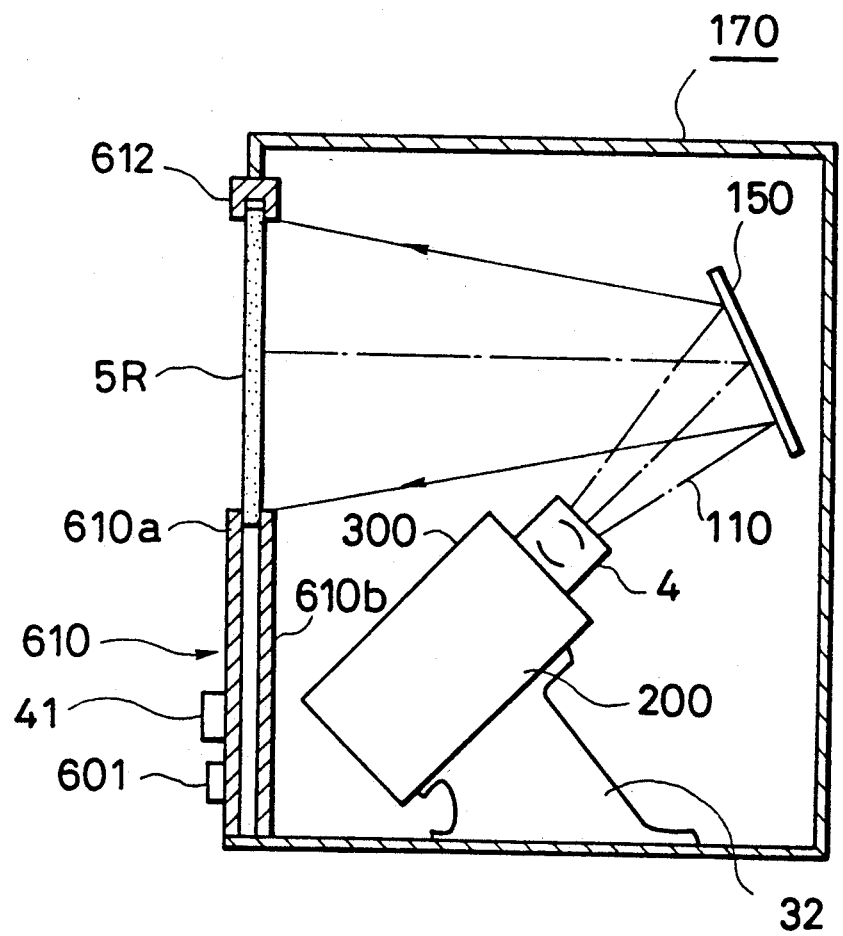
FIG. 4 is a sectional view of a second embodiment of the present invention being used for rear projection.

For the rear projection, the rear projection screen 5R is in the first position, as shown in FIG. 4, and the image rays 110 are projected onto the inner side of the rear projection screen 5R, and the image on the outer side of the rear projection screen 5R is seen by an observer at a position similar to that in FIG. 1.

Figure 5:
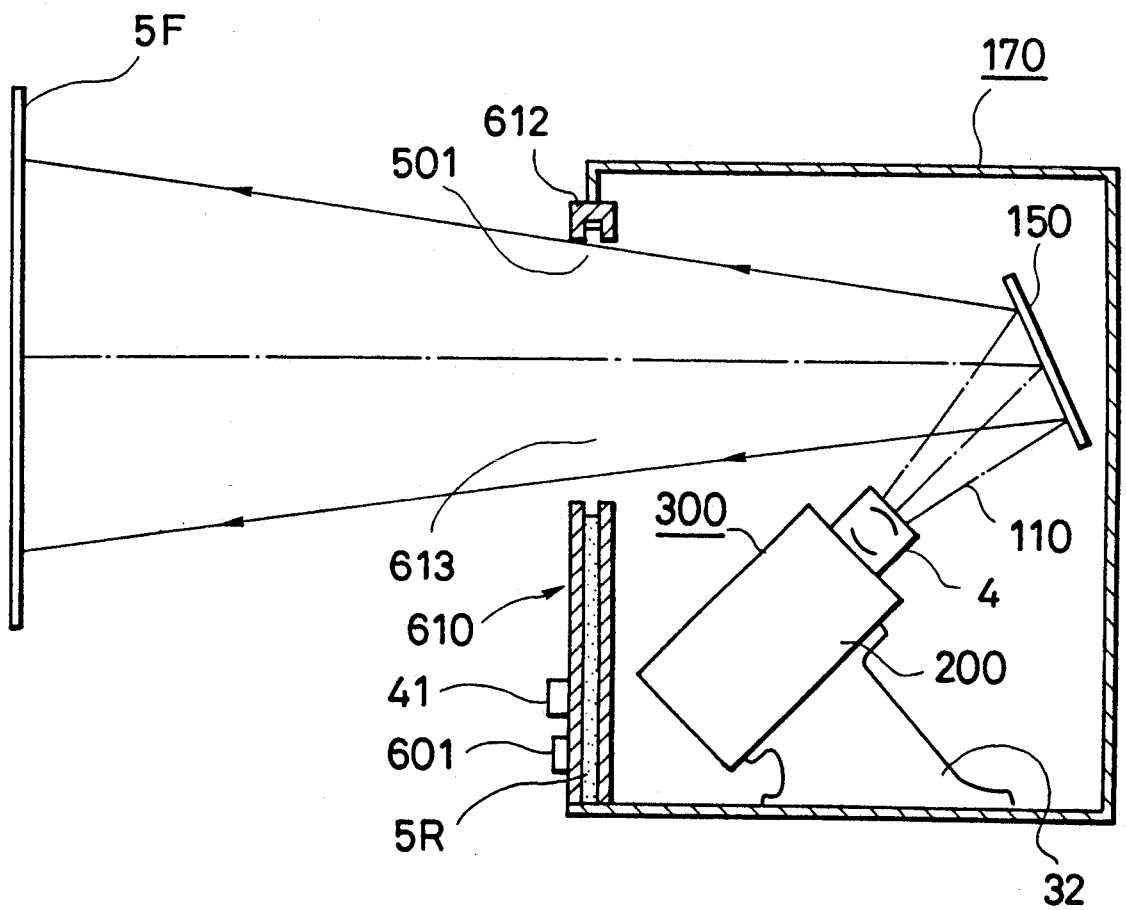
FIG. 5 is a sectional view of the second embodiment being used for front projection.
Figure 6:
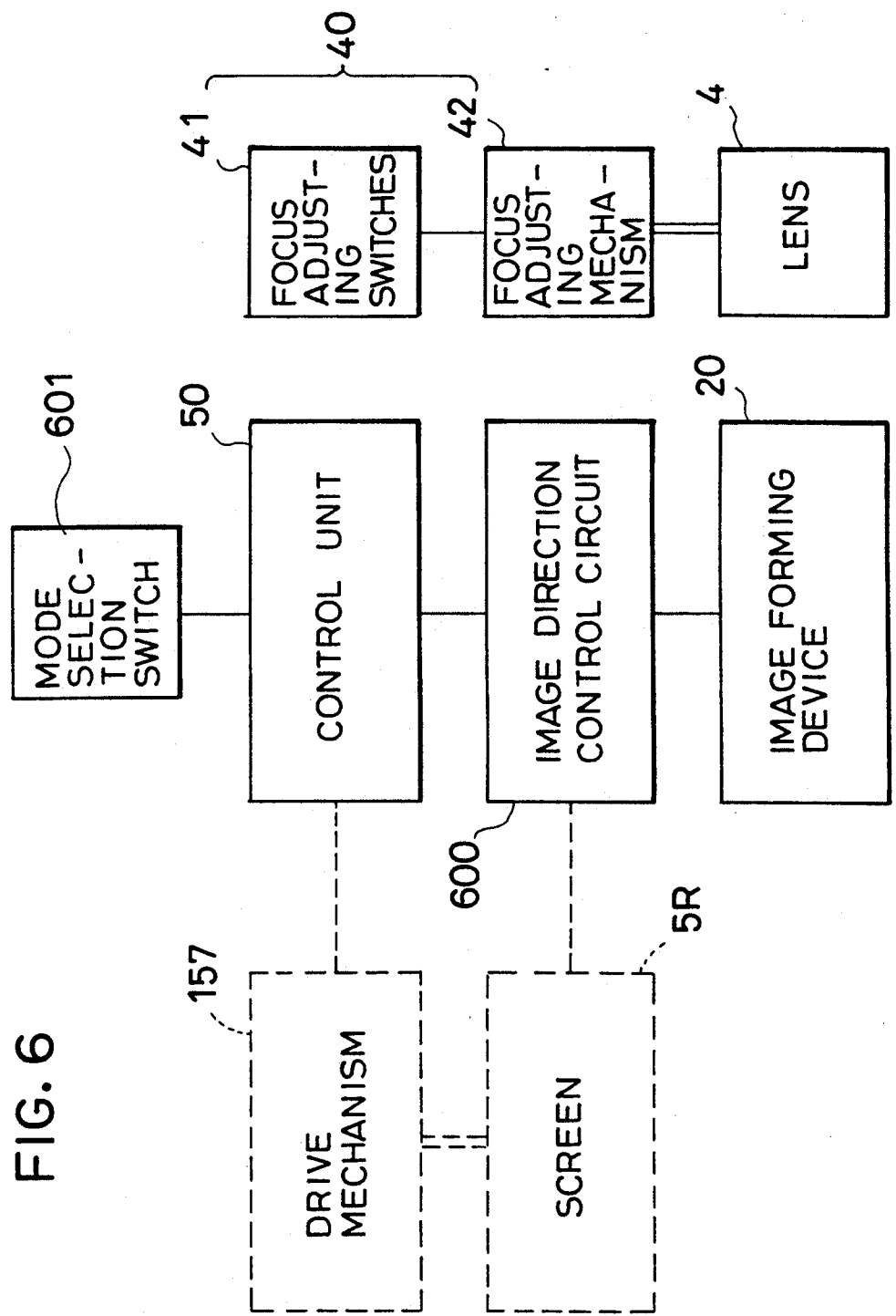
FIG. 6 is a block diagram showing the functional relationship between some of the components of the projection display device of the second embodiment.

For the front projection, the rear projection screen 5R is in the second position, as shown in FIG. 5, and the image is projected onto the screen 5F.

An advantage of the second embodiment is that since the projection change is achieved relatively simply using substantially the same elements as in the prior art of FIG. 20, the production costs are about the same as in the prior art.

In the second embodiment, the rear projection screen 5R slides down in case of the front projection. Other possibilities are sliding the rear projection screen 5R up, or sliding it laterally (either to the left or the right). It may alternatively so arranged that the translucent screen 5R can be removed for the front projection.

In the second embodiment, the slidable rear projection screen 5R is moved manually. It may alternatively so arranged that the slidable projection screen 5R is driven by a drive mechanism 157, which includes a motor, and which is indicated by dotted lines in FIG. 6, and is responsive to the mode selection switch 601 via the control unit 50, as shown in FIG. 6, for movement between the first and the second positions.

Third Embodiment

A third embodiment of the invention will next be described with reference to FIG. 7, FIG. 8 and FIG. 9. The projection display device of this embodiment comprises a projector 300, a cabinet 170, a slidably mounted mirror 150, a rear projection screen 5R, a front projection screen 5F, a focus adjusting device 40, a mode selection switch 601, and an image direction control circuit 600.

The cabinet 170 has an opening 176 (FIG. 8), and front and rear guides 173 and 174 extending from the edges of the opening 176 and vertically down, parallel with each other. A mirror mount 620 can be manually moved, sliding up and down through the opening 176, and has a rear surface engaging with and slidably supported by the guide 174 and a front surface engaging with and slidably supported by the guide 173, so that the mirror mount 620 can slide up and down along the guides 173 and 174. The mirror 150 mounted to the mirror mount 620 can therefore selectively assume a first position shown in FIG. 7 at which the mirror 150 is inside the cabinet 170, and a second position shown in FIG. 8 at which the mirror 150 is outside the cabinet 170. The rear surface of the mirror mount 620 is kept in contact with the guide 172, while the front surface of the mirror mount 620 is in contact only when the mirror mount 620 is at or near the first position.

The projector 300 may be, for example the same as that in the second embodiment, except that it is so oriented as to emit image rays 110 upward.

The rear projection screen 5R forms a surface of the cabinet 170 and is substantially the same as that in the first embodiment.

The front projection screen 5F is disposed outside the cabinet and is substantially the same as that in the first embodiment.

Figure 7:
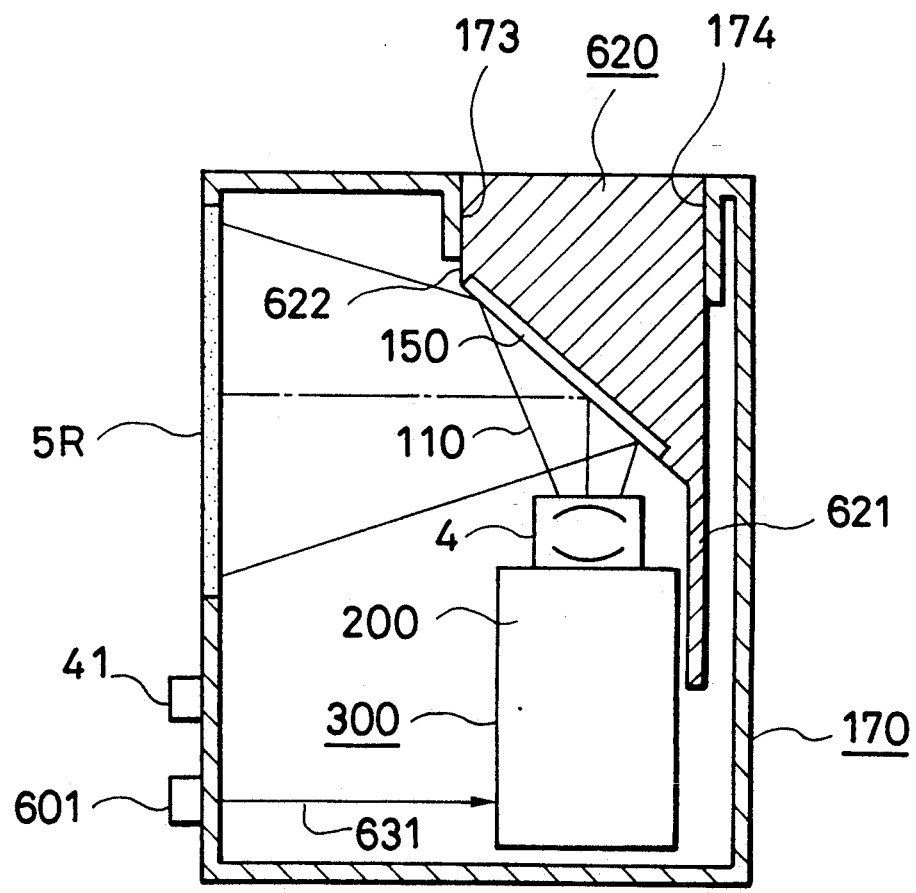
FIG. 7 is a sectional view of a third embodiment of the present invention being used for rear projection.

In the first position shown in FIG. 7, the image rays 110 from the projector 300 are reflected at the mirror 150 situated inside the cabinet 170, and are projected on the rear surface of the rear projection screen 5R. In this state, the mirror mount 620 completely blocks the opening 176, and leakage of light into the cabinet 170 is therefore prevented.

Figure 8:
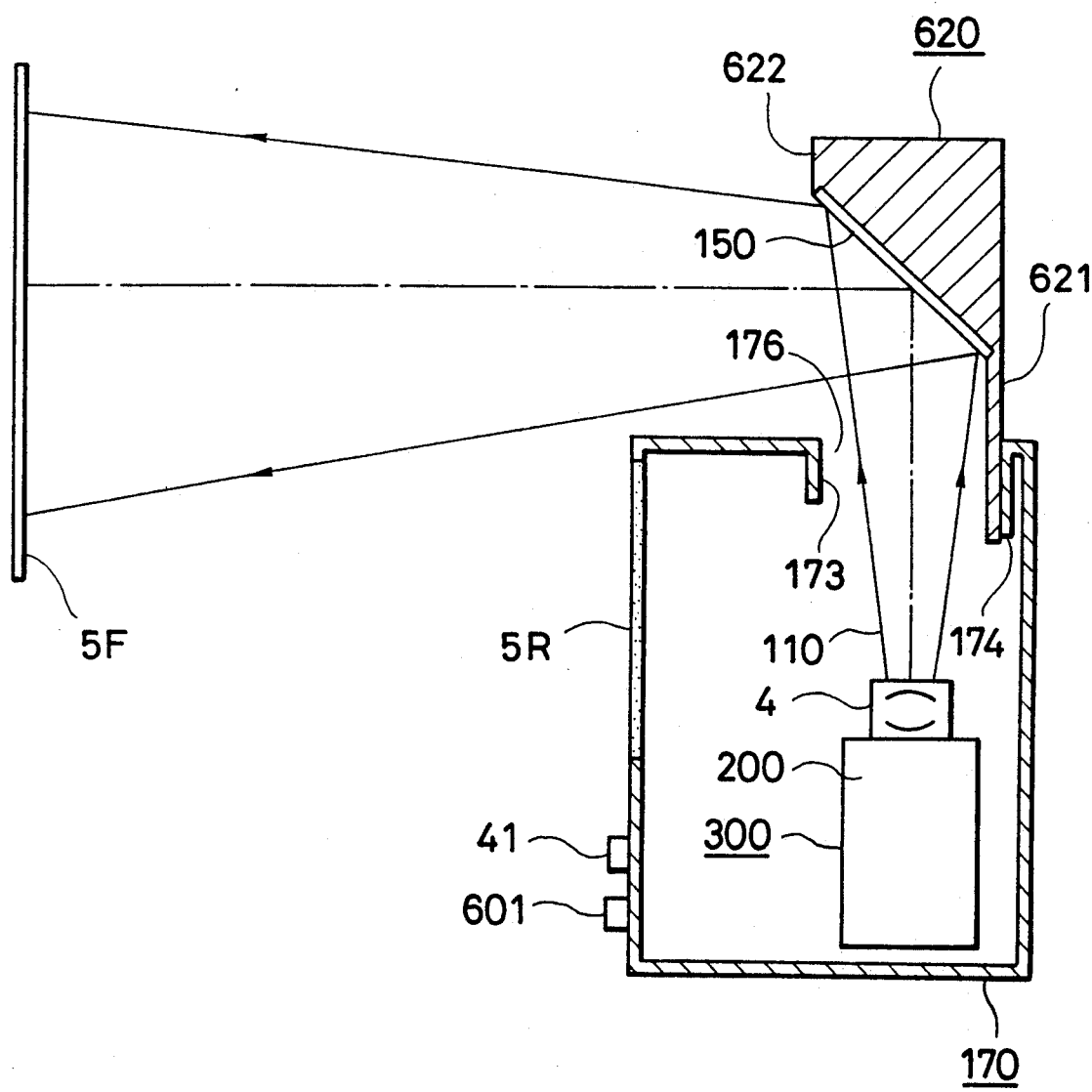
FIG. 8 is a sectional view of the third embodiment being used for front projection.
Figure 9:
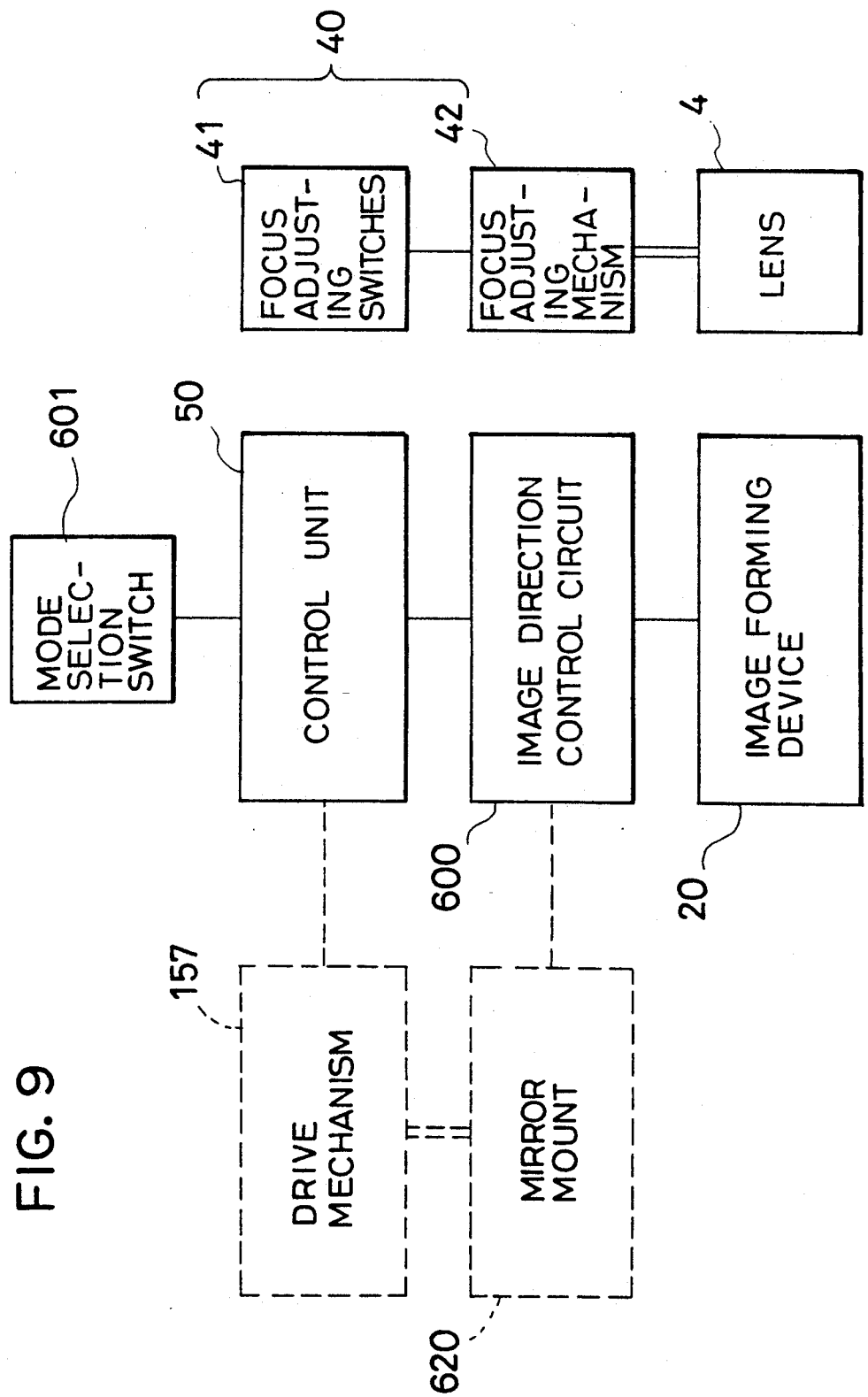
FIG. 9 is a block diagram showing the functional relationship between some of the components of the projection display device of the third embodiment.

In the second position shown in FIG. 8, the image rays 110 from the projector 300 are reflected by the mirror 150, which is now situated outside the cabinet 170, and projected onto the front projection screen 5F.

The mode selection switch 601 and the focus adjusting switches 41 are provided on the exterior of the cabinet 170, as in the second embodiment, and the image direction control circuit 600 and focus adjusting mechanism 42 are controlled in the same way as in the second embodiment.

The third embodiment requires only simple, inexpensive mechanical components for the switching.

In the embodiment described above, the number of mirrors is not restricted to one; using two or more mirrors is possible. When two or more mirrors are used, it is advantageous that the first mirror (the mirror at which the image rays 110 from the projector is first reflected) be movable for switching between the front and rear projection methods. This is because the first mirror is the smallest and the necessary amount of movement between the first and second positions is the smallest, and a mechanism for movably holding and moving a smaller mirror is simpler and more compact.

In the third embodiment, the mirror mount 620 is moved manually. It may alternatively so arranged that the mount 620 is driven by a drive mechanism 157, which includes a motor, and which is indicated by dotted lines in FIG. 9, and is responsive to the mode selection switch 601, as shown in FIG. 9, for movement between the first and the second positions.

Fourth Embodiment

A fourth embodiment of the invention will now be described with reference to FIG. 10, FIG. 11 and FIG. 12. The projection display device of this embodiment comprises a projector 300, a cabinet 170, a rotatable mirror 150, a fixed mirror 160, a rear projection screen 5R, a front projection screen 5F, a focus adjusting device 40, a mode selection switch 601, and an image direction control circuit 600.

The cabinet 170 has a light blocking cover 500 that covers an opening or window 501 when the front projection is not in use, particularly during the rear projection, but is otherwise substantially similar to that in the prior art of FIG. 20. The light blocking cover 500 is removed and attached manually.

The rotatable mirror 150 is rotatable about a pin 151 which extends perpendicularly to a plane (hypothetical plane) containing the optical axis of the image rays 110, and is driven by a mirror driving mechanism 152, which operates responsive to the mode selection switch 601. The rotatable mirror 150 can selectively assume a first position (shown in solid line in FIG. 10) and a second position (shown in dotted line in FIG. 10).

When the rotatable mirror 150 is in the first position, the opening 501 is preferably closed with the light blocking cover 500. Image rays 110 from the projector 300 are reflected by the rotatable mirror 150, which is at the first position, and by the fixed mirror 160, and projected on the rear projection screen 5R. To avoid leakage of light into the cabinet 170, which would tend to degrade the picture quality, the opening 501 is covered by the light blocking cover 500.

When the rotatable mirror 150 is in the second position, i.e., in a retracted position which does not reflect or obstruct the image rays 110 from the projector 300, the light blocking cover 500 is removed, and image rays 110 from the projector 300 are passed through the opening 501 and projected onto the front projection screen 5F.

The mode selection switch 601 and the focus adjusting switches 41 are provided on the exterior of the cabinet 170, as in the second embodiment, and the image direction control circuit 600 and the focus adjusting mechanism 42 are controlled in the same way as in the second embodiment.

In case of rear projection it is not always necessary for the light blocking cover 500 to cover opening 501. If the displayed image is clearly visible even when opening 501 uncovered, then opening 501 may be left uncovered.

In the fourth embodiment, the light blocking cover 500 is removed and attached manually. It may alternatively so arranged that the light blocking cover 500 is moved, e.g., rotation about a pin, not shown, along one of the edges of the cover 500 or sliding along the wall cabinet 170 for opening and closing the opening 501. In such a case, the light blocking cover 500 may be driven by a drive mechanism 502, which includes a motor, which is indicated by dotted lines in FIG. 12, and is responsive to the mode selection switch 601 via the control unit 50.

Figure 13:
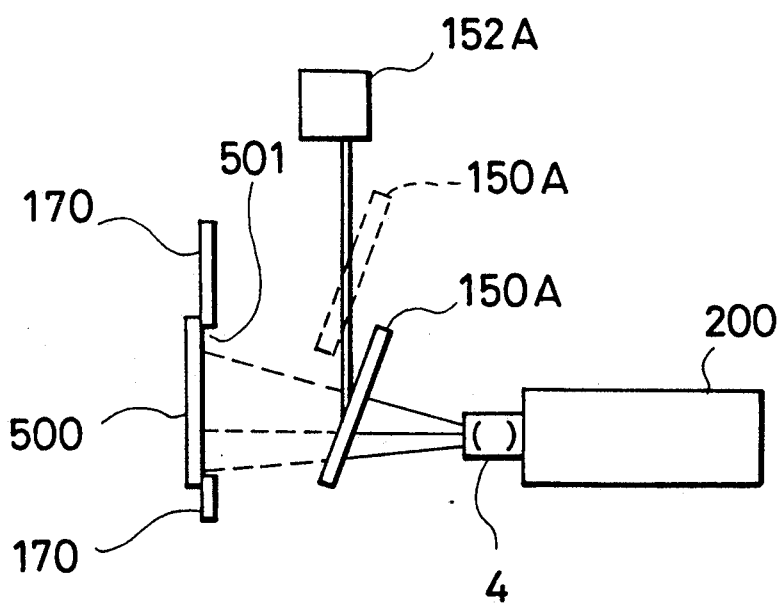
FIG. 13 is a sectional view showing a modification of a mirror in the fourth embodiment.

In place of the rotatable mirror 150, a mirror capable of translation movement may be used. That is, as illustrated in FIG. 13, a mirror 150A may be provided to be driven by a mirror drive mechanism 152A to assume a first position, indicated by a solid line, for reflecting the image rays 110 to the fixed mirror 160 for rear projection, and a second position, indicated by dotted lines, retracted from the optical path of the image rays 110 from the projector 300 to achieve the front projection.

Fifth Embodiment

A fifth embodiment of the invention will now be described with reference to FIG. 14. The projection display device of this embodiment is similar to the fourth embodiment, but differs from it in that another fixed mirror 180 is additionally provided. Other elements in FIG. 14 are similar to the elements in FIG. 10 and FIG. 11.

Figure 14:
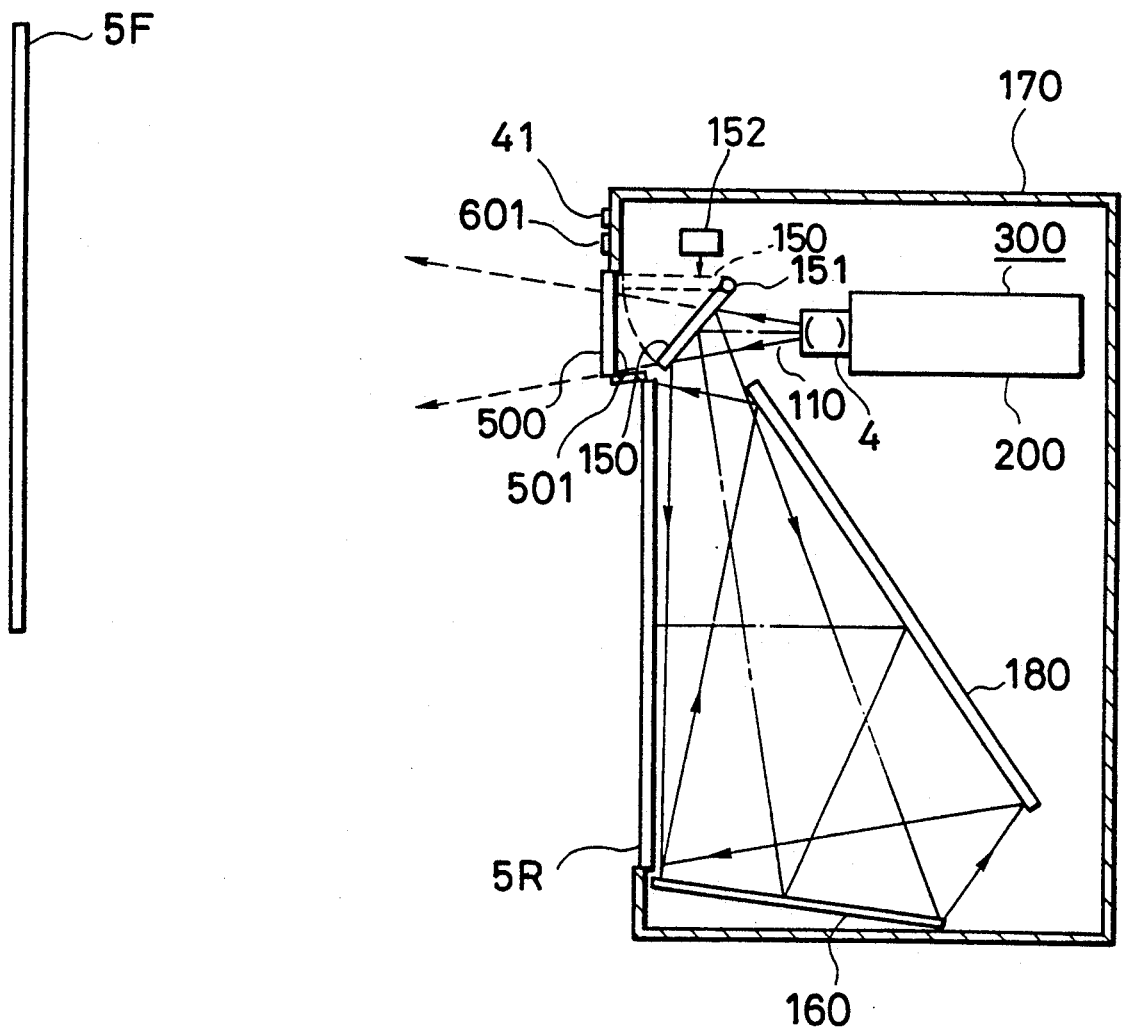
FIG. 14 is a sectional view of a fifth embodiment of the invention.
Figure 15:
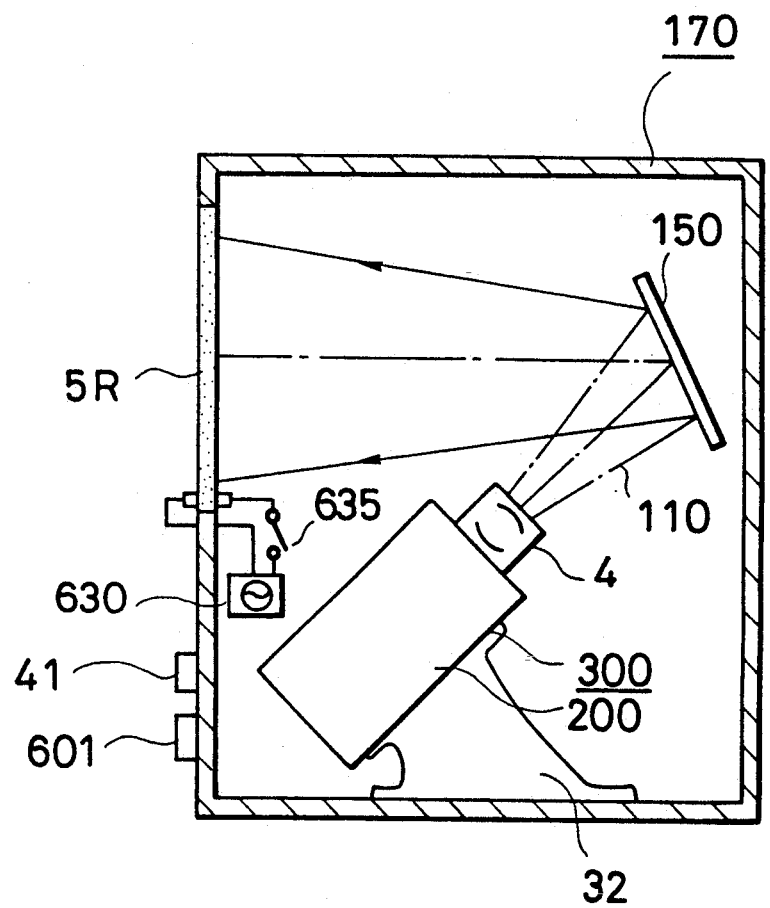
FIG. 15 is a sectional view of a sixth embodiment of the present invention being used for rear projection.

For the rear projection, the rotatable mirror 150 is at the first position indicated in solid line in FIG. 14. The image rays 110 from the projector 300 are reflected by the mirror 150, which is disposed just in front of the projection lens 4, and directed downward (toward the floor of the cabinet 170), and reflected at the second mirror 160, and directed obliquely upward, and reflected at the third mirror 180, and directed laterally, toward the rear projection screen 5R.

For the front projection, the rotatable mirror 150 is in the second position indicated by the dotted lines, and the light blocking cover 500 is removed. The image rays 110 from the projector 300 are passed through the opening 501 and are directly projected onto the screen 5F.

Figure 10:
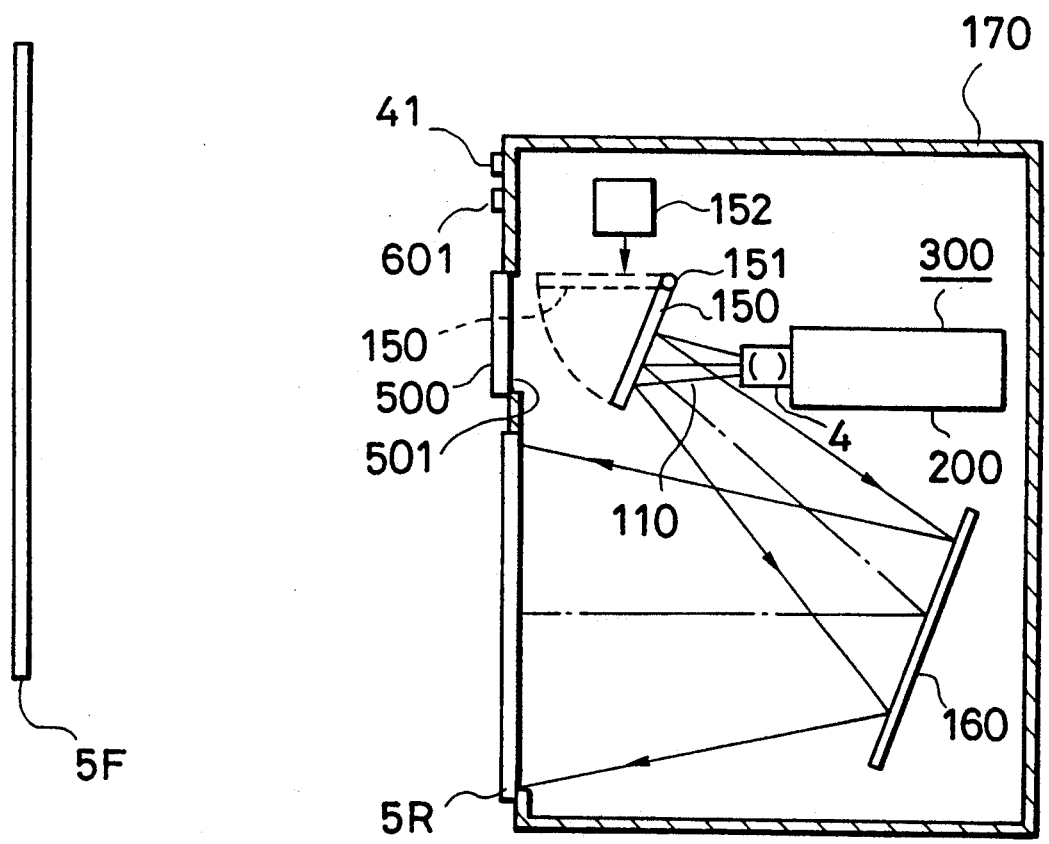
FIG. 10 is a sectional view of a fourth embodiment of the present invention being used for rear projection.
Figure 11:
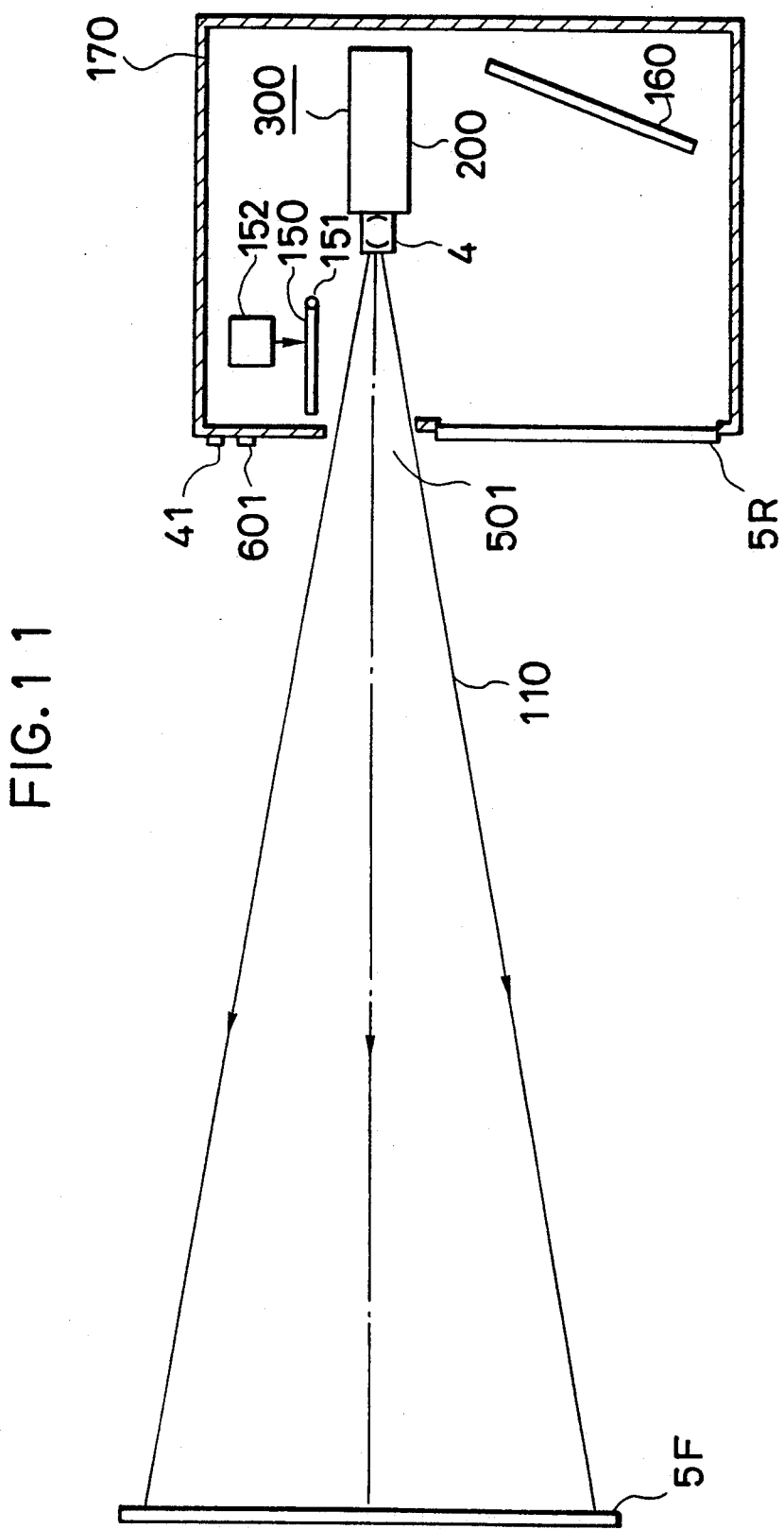
FIG. 11 is a sectional view of the fourth embodiment being used for front projection.
Figure 12:
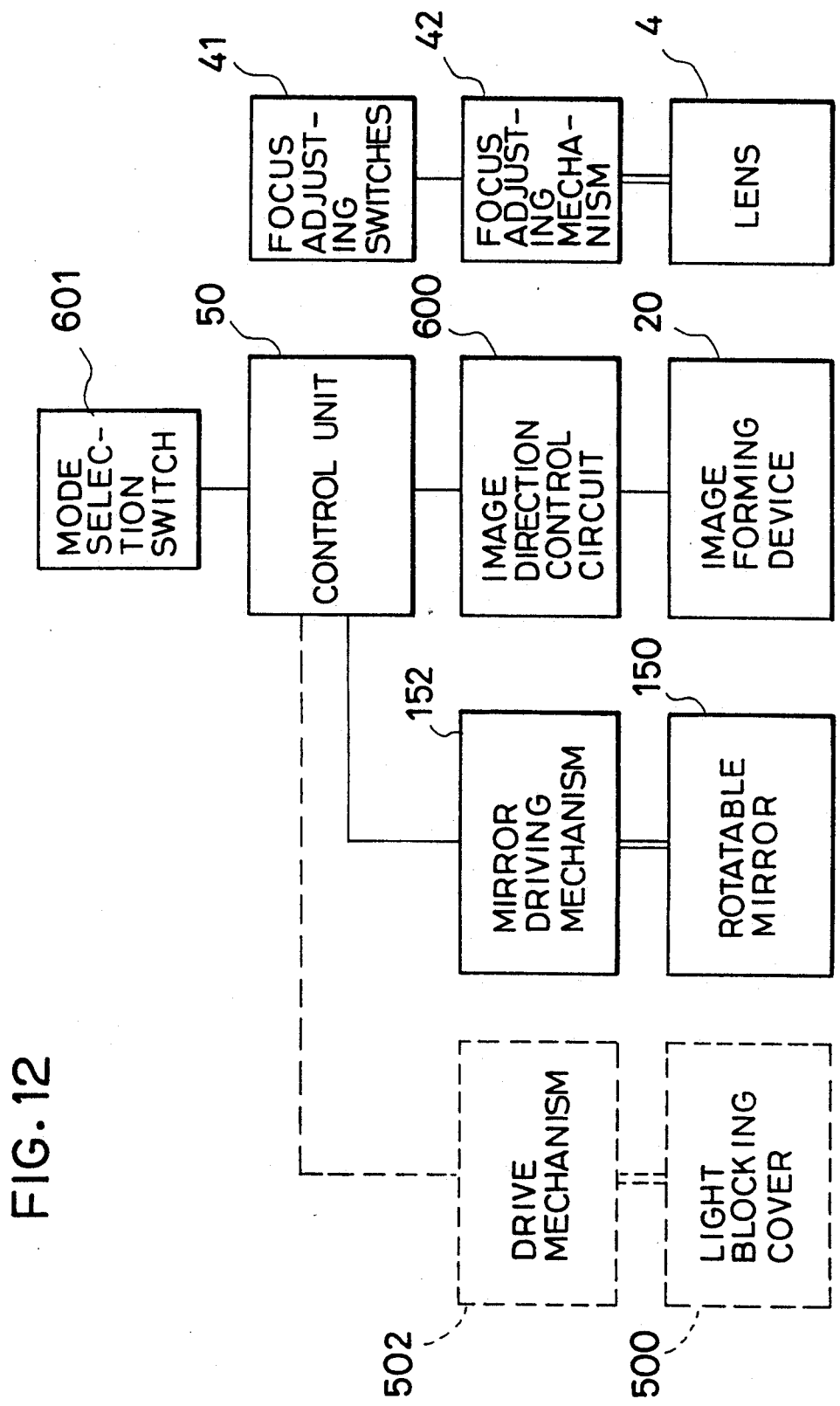
FIG. 12 is a block diagram showing the functional relationship between some of the components of the projection display device of the fourth embodiment.

Compared with the embodiment of FIG. 10 and FIG. 11 the projection display device of FIG. 14 comprises one more mirror. Because of this extra mirror the optical path (projection distance) is lengthened, enabling greater enlargement of the picture, though the size of the cabinet 170 is not changed.

The mode selection switch 601 and the focus adjusting switches 41 are provided on the exterior of the cabinet 170, as in the fourth embodiment, and the image direction control circuit 600 and focus adjusting mechanism 42 are controlled in the same way as in the fourth embodiment.

Moreover, because of the rotation of image through 180° by means of the three mirrors, the up/down direction of the image is reversed, so it is necessary to reverse the up/down direction of the image as formed in the image-forming device 20. The image direction control circuit 600 of this embodiment has the function of such control over the up/down direction of the image, as well as the left/right direction of the image.

Sixth Embodiment

A projection display device of a sixth embodiment will next be described with reference to FIG. 15, FIG. 16, FIG. 17A, FIG. 17B and FIG. 18. The projection display device of this embodiment comprises a projector 300, a cabinet 170, a mirror 150, a rear projection screen 5R, a front projection screen 5F, an a.c. (alternating-current) electric source 630, a screen state controlling switch 635, a focus adjusting device 40, as well as a mode selection switch 601 and an image direction control circuit 600.

This embodiment is identical to the second embodiment, except that the rear projection screen 5R is not slidable but can changes its state between a transparent state and a translucent state.

That is, it is composed of a scattering-type liquid crystal panel. It has electrode films on both sides, and it is transparent when an a.c. voltage is applied across the electrode films, and is translucent (the state of a frosted glass) when the voltage is not applied. The a.c. voltage source 630 is provided for the application of the a.c. voltage. The screen state controlling switch 635 is closed when the front projection is intended and is open when the rear projection is intended. The operation of the screen state controlling switch 635 is controlled by the mode selecting switch 601: when the rear projection is selected by the mode selection switch 601, the screen state control switch 635 is open, while when the front projection is selected by the mode selection switch 601, the screen state control switch 635 is closed.

Figure 17A:
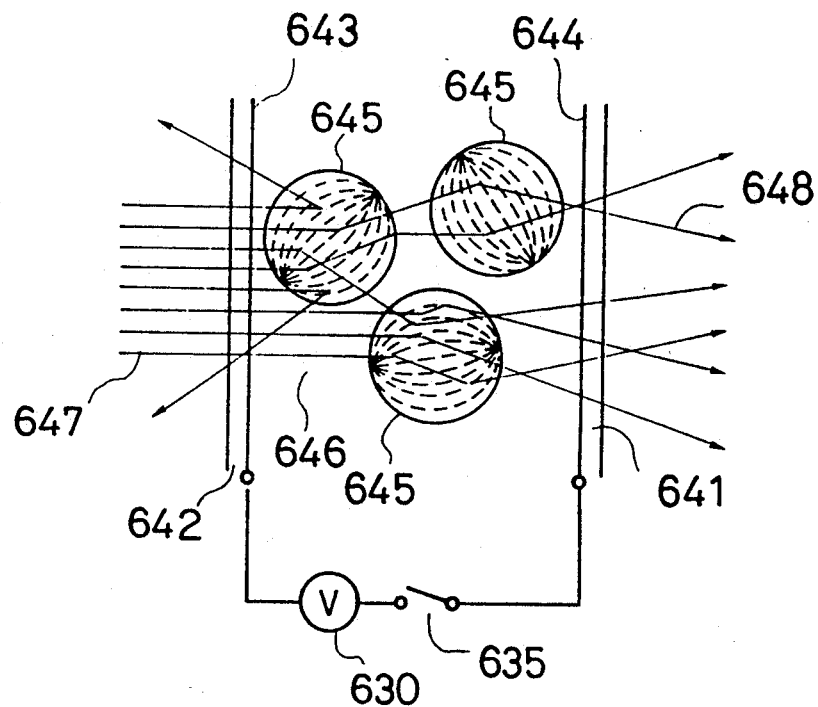
FIG. 17A and FIG. 17B are enlarged sectional views of a liquid crystal panel illustrating its translucent and transparent states.
Figure 17B:
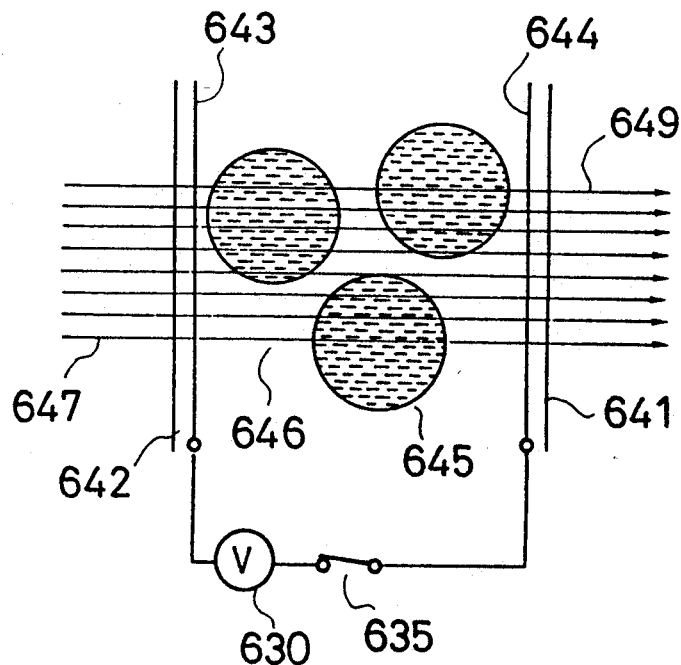
Figure 18:
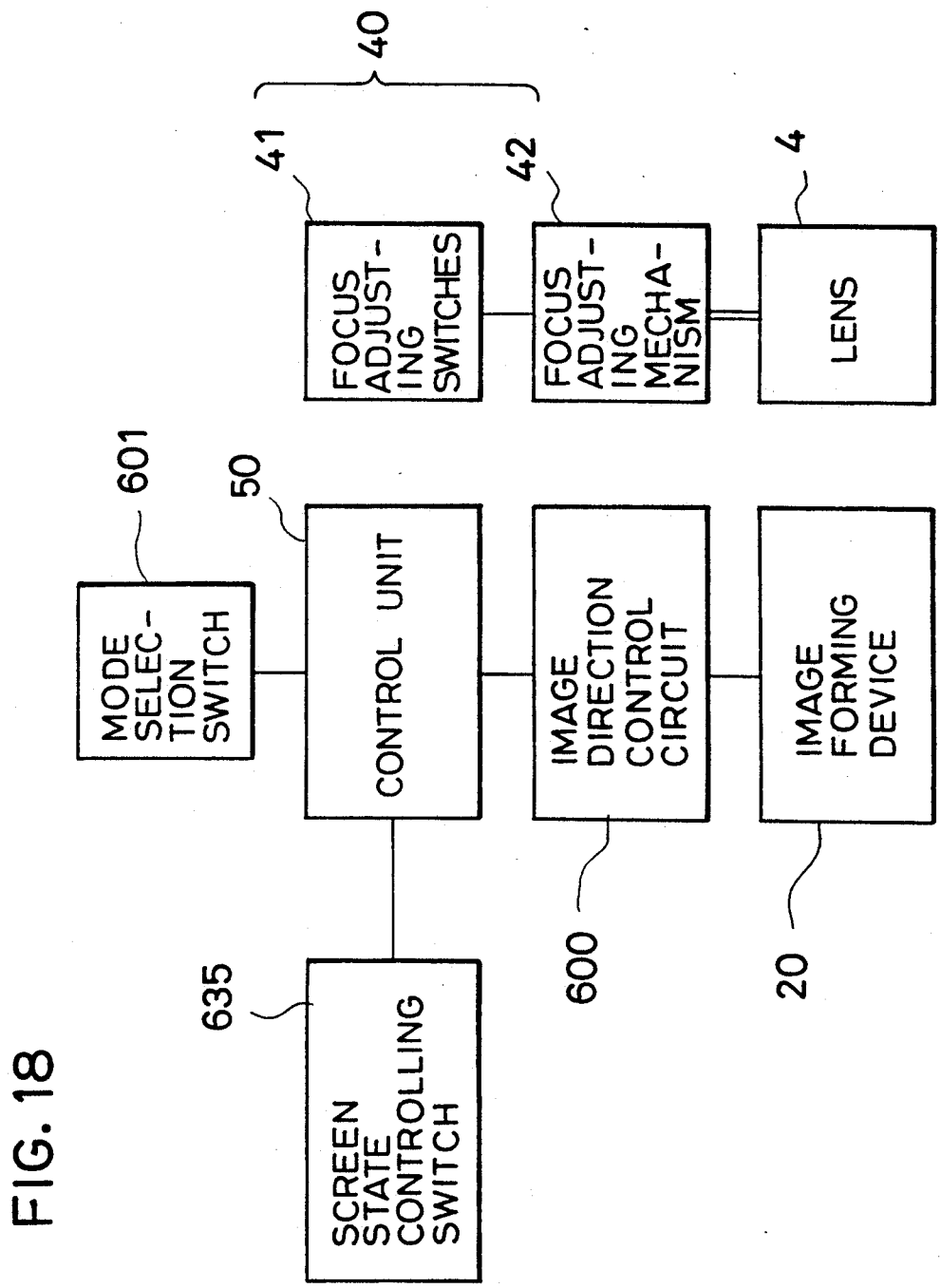
FIG. 18 is a block diagram showing the functional relationship between some of the components of the projection display device of the sixth embodiment.

As illustrated in the enlarged cross sectional views of FIG. 17A and FIG. 17B, the liquid crystal panel forming the rear projection screen 5R comprises a pair of transparent substrates 641 and 642 spaced by about 5 to 30 $\mu$m and having transparent electrode films 643 and 644 attached or formed on their inner surfaces, i.e., the surfaces facing the other of the pair of the substrates 641 and 642. The space between the substrates 641 and 642 is filled with a transparent polymer material 646, in which minute spherical capsules 645 are embedded. The spherical capsules 645 are not more than a few $\mu$m in diameter and are filled with a liquid crystal substance.

When no voltage is applied across the electrode films 643 and 644, the molecules of the liquid crystal are oriented at random, as shown in FIG. 17A, so the liquid crystal panel is in the scattering state, and the incident light 647 is scattered generating scattered light 648. The panel therefore is translucent, and an image is seen on the side opposite to the side on which the light is incident. That is, the panel can serve as a rear projection screen and the rear projection is realized.

Figure 16:
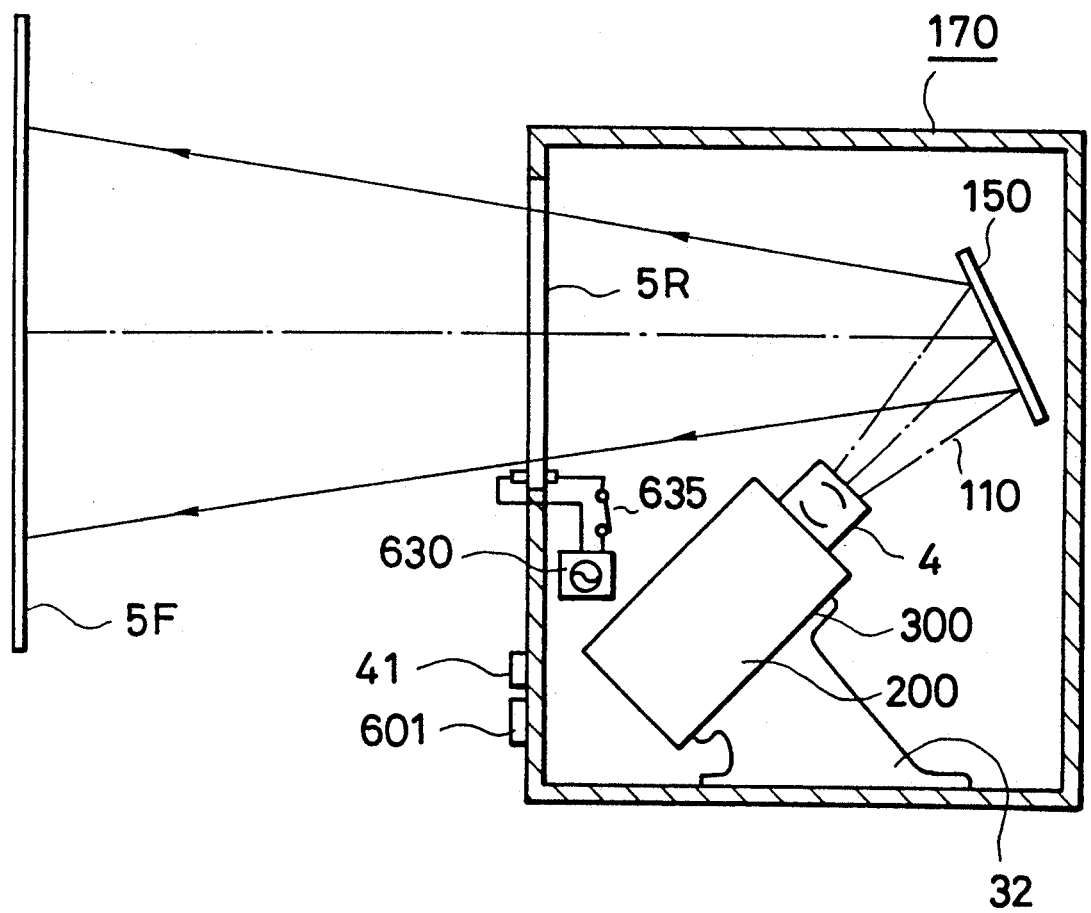
FIG. 16 is a sectional view of the sixth embodiment being used for front projection.

When a voltage of a certain magnitude is applied across the electrode films 643 and 644, the molecules of the liquid crystal are "aligned" or regularly oriented, as shown in FIG. 17B, so that the panel is transparent. The incident light 647 therefore passes through the panel without significant attenuation to become a transmitted light 649. With this state, the image rays 110 from the projector 300 pass through the rear projection screen 5R, and are projected on the front projection screen 5F, as shown in FIG. 16. The front projection is thus realized.

The switching between the two states can be completed within about 1 seconds, so the switching between the two projection methods can be achieved at a high speed.

Details of the scattering-type liquid crystal is found in J. W. Doane, et al.; Applied Physics Letters, Vol. 48, No. 4 (1981), pp. 269-271, which is hereby incorporated by reference.

Besides the quick switching between the two projection methods, the elimination of the mechanical movement (sliding) of the rear projection screen 5R (as in the second embodiment) improves the reliability of the system.

The mode selection switch 601 and the focus adjusting switches 41 are provided on the exterior of the cabinet 170, as in the second embodiment, and the image direction control circuit 600 and focus adjusting mechanism 42 are controlled in the same way as in the second embodiment.

Additional Considerations

In all of the above embodiments, the cabinet 170 is an enclosure preventing entry of light, except through the aperture, opening, window, or the like specifically mentioned, and leakage of environmental light into the cabinet is substantially completely prevented, at least in the rear projection. This is desirable to improve the visibility or the contrast of the image in the rear projection.

The front projection screen 5F can be most comfortably viewed if positioned vertically, as indicated in FIG. 2, FIG. 5, FIG. 8, FIG. 11, FIG. 14, and FIG. 16. The projector 300 should therefore be mounted so that its optic axis is horizontal, as shown in the drawings. In the second to fifth embodiments described, the window or opening 501 or 176 through the cabinet 170 for passage of image rays 110 for projection onto the front projection screen 5F is disposed above the rear projection screen 5R. This configuration is preferable. If the opening 501 or 176 were disposed below the rear projection screen 5R, and hence near the floor, the image rays 110 would travel close to the floor, during the front projection, and they could easily be obstructed by objects on the floor or the floor itself.

In the sixth embodiment, the rear projection screen 5R which is transparent during the front projection for passage of image rays 110 is preferably disposed in the upper part of cabinet 170 to be farther away from the floor for the same reason.

In the various embodiments described above, a single projection lens 4 is provided to transmit all three primary colors. In this system, the three colors are combined before they enter the lens 4. The image rays 110 therefore have the same optical path and are projected together onto the screen; even if the optical path length changes the three primary colors will be projected together. In another projection method, the three-lens method, the three primary colors are projected separately and combined on the screen. In this case complicated and high-precision convergence adjustment is necessary to align the three projected primary color images with each other. This adjustment is especially necessary when the length of the optical path is changed, for example due to the change of projection method. In the projection display device according to the present invention one-lens projection is therefore highly preferable, although the present invention embraces, within its scope, the three-lens projection method.

Figure 21:
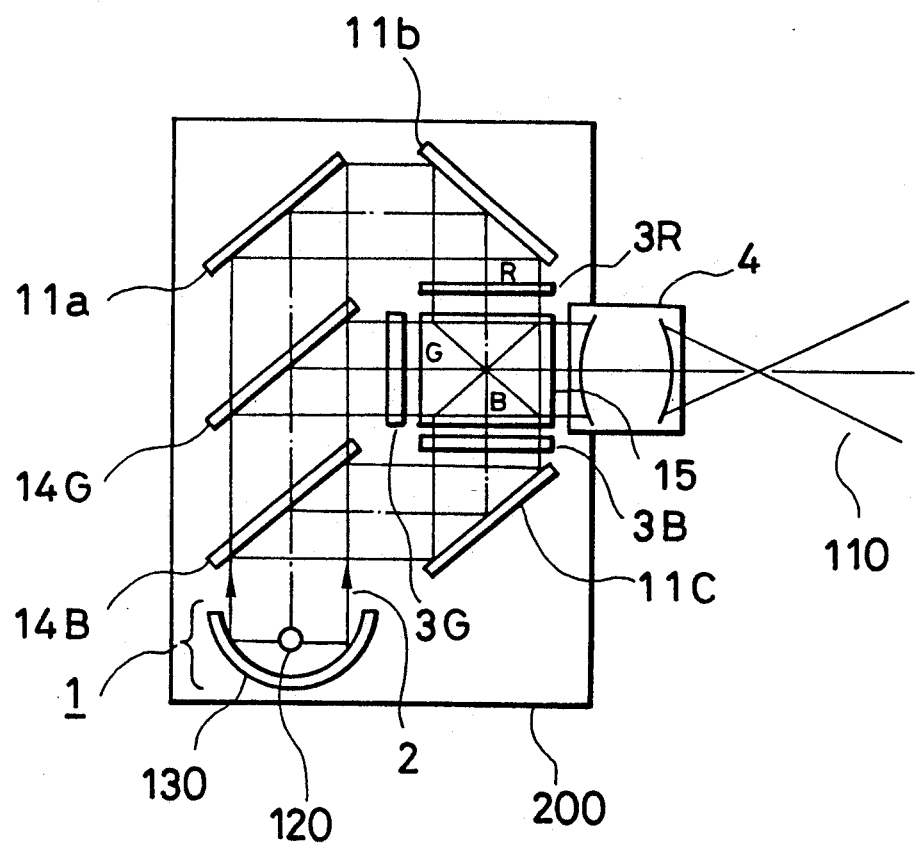
FIG. 21 is a schematic diagram of a projector used in the front projection device of FIG. 19.

FIG. 21 shows a projector 300 having three liquid crystal display panels. The number of liquid crystal display panels is not restricted to three. The present invention is applicable to monochromatic devices as well, and the invention is also applicable where the full-color image is formed by a single liquid crystal display panel.

The image-forming device is not limited to a device containing liquid crystal display panels. The present invention also applies to a cathode-ray-tube picture display device or the like.

A zoom lens may be used as the projection lens 4. The use of a zoom lens is advantageous in that the magnification factor can be varied. For front projection, the size of the enlarged image on the front projection screen can be determined independently of the size of the cabinet. When a zoom lens is used, switches for zoom adjustment may additionally be provided on the exterior of the cabinet or on the projector housing, and a motor-driven zoom adjustment mechanism may additionally be built in the projector.

As described above the present invention combines a front projection method and a rear projection method in one device wherein changing the projection method is possible in an easy way. Thus front projection can be used for a big projection display. Rear projection can be used for a projection display which will not loose its visibility, under normal illumination. Compared with the prior art, in which two devices are needed to obtain the same result as in the present invention, the present invention takes up less space and is considerably lower in price.

What is claimed is:

1. A projection display device capable of selectively operating in a front projection mode and a rear projection mode, comprising:
   a projector for emitting image rays;
   a cabinet including a rear projection screen for receiving image rays on a first surface facing the interior of the cabinet for display on an opposite, second surface in said rear projection mode; and
   a front projection screen disposed outside said cabinet, for receiving the image rays on a third surface and for displaying the image on said third surface in said front projection mode;
   said cabinet having a mounting section formed at a part of said cabinet and for setting said projector at a predetermined position such that when said projector is set in said predetermined position the image rays from said projector travel within said cabinet to the first surface of said rear projection screen;
   wherein said mounting section is formed on the exterior of said cabinet, and said cabinet has an aperture through which the image rays from said projector are passed into the cabinet.

2. The device of claim 1, wherein said projector is removable from said mounting section, and can be set for projection on said front projection screen.

3. The device of claim 1, wherein the optical axis of the image rays incident onto the front projection screen is above the optical axis of the image rays incident onto the rear projection screen.

4. The device of claim 1, also comprising at least one mirror mounted in said cabinet, for reflecting said image from said projector to said rear projection screen.

5. The device of claim 1, further comprising:
   an image direction control means for controlling the direction of the image as formed in said projector, depending on the projection mode.

6. The device of claim 5, further comprising a detector means for detecting the setting of the projector at said predetermined position, wherein said image direction control means is responsive to the detector for controlling the image direction.

7. The device of claim 1, wherein said rear projection screen forms a part of a wall of said cabinet.

8. The device of claim 1, wherein said cabinet is so formed as to block entry of substantially all environmental light into the cabinet at least in said rear projection mode.

9. The device of claim 1, further comprising focus adjusting means for adjusting the focus of the image rays onto either the rear projection screen or the front projection screen, said focusing adjusting means having the same optical axis for adjusting the focus on both the rear projection screen and the front projection screen.

10. The device of claim 1, wherein the projector comprises an image forming device and a projection lens.

11. The device of claim 10, wherein the image forming device comprises a liquid crystal display panel.

12. The device of claim 10, wherein the image forming device comprises a cathode-ray tube.

13. The device of claim 10, wherein image forming device comprises a plurality of image forming devices for respective colors, and a projection lens receiving image rays from all of said plurality of image forming devices and emitting a set of combined image rays.

14. The device of claim 10, wherein the projection lens is a zoom lens.

15. The device of claim 1, wherein the optical axis of the image rays incident onto the front projection screen and the optical axis of the image rays incident onto to the rear projection screen are both substantially horizontal.

16. A projection display device capable of selectively operating in a front projection mode and a rear projection mode, comprising:
   a cabinet;
   a projector disposed in said cabinet and emitting image rays;
   a rear projection screen provided on said cabinet, for receiving image rays on a first surface facing the interior of said cabinet for display on an opposite, second surface in said rear projection mode;
   a front projection screen disposed outside said cabinet, for receiving the image rays on a third surface and for displaying the image on said third surface in said front projection mode; and
   selective light guide means for guiding image rays from said projector either to said rear projection screen or to said front projection screen including:
      a window formed in said cabinet;
      a mirror disposed in said cabinet and movable between a first position in which said mirror reflects said image rays to said rear projection screen, and a second position in which said mirror is retracted away from the optical path of the image rays to allow said image rays to pass through said window to said front projection screen;
      a mirror operating mechanism for causing said mirror to be in said first position when said rear projection mode is selected, and causing said mirror to be in said second position when said front projection mode is selected; and
   wherein said cabinet is so formed as to block entry of substantially all environmental light into the cabinet at least in said rear projection mode.

17. The device of claim 16, wherein said mirror is rotatable about an axis perpendicular to a plane containing the optical axis along which the image rays propagate.

18. The device of claim 17, wherein the mirror is rectangular and is rotatable about an axis along one edge of the mirror.

19. The device of claim 17, wherein the mirror is capable of translation movement between the first and the second positions.

20. The device of claim 17, further comprising cover means for covering said window during rear projection.

21. The device of claim 17, further comprising a second mirror for reflecting said image from said first mirror to said rear projection screen.

22. The device of claim 16, wherein the mode selection switch is a manually operated switch mounted on the exterior of the cabinet.

23. The device of claim 16, wherein said rear projection screen forms a part of a wall of said cabinet.

24. The device of claim 16, further comprising focus adjusting means for adjusting the focus of the image rays onto either the rear projection screen or the front projection screen.

25. The device of claim 16, further comprising an image direction control means for controlling the direction of the image as formed in said projector, depending on the projection mode.

26. The device of claim 16, wherein the projector comprises an image forming device and a projection lens.

27. The device of claim 26, wherein the image forming device comprises a liquid crystal display panel.

28. The device of claim 26, wherein the image forming device comprises a cathode-ray tube.

29. The device of claim 26, wherein the image forming device comprises a plurality of image forming devices for respective colors, and a projection lens receiving image rays from all of said plurality of image forming devices and emitting a combined set of image rays.

30. The device of claim 26, wherein the projection lens is a zoom lens.

31. The device of claim 16, wherein the optical axis of the image rays incident onto the front projection screen and the optical axis of the image rays incident onto the rear projection screen are both substantially horizontal.

32. The device of claim 16, wherein the optical axis of the image rays incident onto directed to the front projection screen is above the optical axis of the image rays incident onto the rear projection screen.

33. A projection display device capable of selectively operating in a front projection mode and a rear projection mode, comprising:
- a cabinet;
- a projector disposed in said cabinet and emitting image rays;
- a rear projection screen provided on said cabinet, for receiving image rays on a first surface facing the interior of said cabinet for display on an opposite, second surface in said rear projection mode;
- a front projection screen disposed outside said cabinet, for receiving the image rays on a third surface and for displaying the image on said third surface in said front projection mode; and
- selective light guide means for guiding image rays from said projector either to said rear projection screen or to said front projection screen including a window formed in a wall of said cabinet,
- positioning means for positioning said rear projection screen at a first position occupying said window for receiving the image rays from said projector in said rear projection mode, and for positioning said rear projection screen at a second position not blocking said window for permitting passage of the image rays from said projector thereby to permit projection of the image rays onto the front projection screen.

34. The device of claim 33, also comprising sliding means for permitting sliding of said rear projection screen between said first position and said second position.

35. The device of claim 33, also comprising at least one mirror mounted inside said cabinet, for reflecting said image from said projector to said window.

36. The device of claim 33, wherein the mode selection switch is a manually operated switch mounted on the exterior of the cabinet.

37. The device of claim 33, wherein said rear projection screen forms a part of a wall of said cabinet.

38. The device of claim 33, wherein said cabinet is so formed as to block entry of substantially all environmental light into the cabinet at least in said rear projection mode.

39. The device of claim 33, further comprising focus adjusting means for adjusting the focus of the image rays onto either the rear projection screen or the front projection screen.

40. The device of claim 33, further comprising an image direction control means for controlling the direction of the image as formed in said projector, depending on the projection mode.

41. The device of claim 33, wherein the projector comprises an image forming device and a projection lens.

42. The device of claim 41, wherein the image forming device comprises a liquid crystal display panel.

43. The device of claim 41, wherein the image forming device comprises a cathode-ray tube.

44. The device of claim 41, wherein the image forming device comprises a plurality of image forming devices for respective colors, and a projection lens receiving image rays from all of said plurality of image forming devices and emitting a combined set of image rays.

45. The device of claim 41, wherein the projection lens is a zoom lens.

46. The device of claim 33, wherein the optical axis of the image rays incident onto the front projection screen and the optical axis of the image rays incident onto the rear projection screen are both substantially horizontal.

47. A projection display device capable of selectively operating in a front projection mode and a rear projection mode, comprising:
- a cabinet having an opening;
- a projector disposed in said cabinet and emitting image rays;
- a rear projection screen provided on said cabinet, for receiving image rays on a first surface facing the interior of said cabinet for display on an opposite, second surface in said rear projection mode;
- a front projection screen disposed outside said cabinet, for receiving the image rays on a third surface and for displaying the image on said third surface in said front projection mode; and
- selective light guide means for guiding image rays from said projector either to said rear projection screen or to said front projection screen, including
  - a mirror;
  - means for slidably mounting said mirror at said opening so that said mirror can move through said opening, between a first position in which said mirror is in the cabinet and reflects the image rays from said projector to said rear projection screen, and a second position in which said mirror is outside the cabinet and reflects said image rays from said projector to said front projection screen, said image rays from the projector pass through said opening in the front projection mode.

48. The device of claim 47, wherein said mounting means comprises a mirror mount to which said mirror is fixed, and guide means fixed to said cabinet to guide said mirror mount such that said mirror moves through said opening; wherein said mirror mount blocks said opening when the mirror is in said first position.

49. The device of claim 47 wherein the cabinet has an opening in a top plate of the cabinet.

50. The device of claim 47, wherein the mode selection switch is a manually operated switch mounted on the exterior of the cabinet.

51. The device of claim 47, wherein said rear projection screen forms a part of a wall of said cabinet.

52. The device of claim 47, wherein said cabinet is so formed as to block entry of substantially all environmental light into the cabinet at least in said rear projection mode.

53. The device of claim 47, further comprising focus adjusting means for adjusting the focus of the image rays onto either the rear projection screen or the front projection screen.

54. The device of claim 47, further comprising an image direction control means for controlling the direction of the image as formed in said projector, depending on the projection mode.

55. The device of claim 47, wherein the projector comprises an image forming device and a projection lens.

56. The device of claim 55, wherein the image forming device comprises a liquid crystal display panel.

57. The device of claim 55, wherein the image forming device comprises a cathode-ray tube.

58. The device of claim 55, wherein the image forming device comprises a plurality of image forming devices for respective colors, and a projection lens receiving image rays from all of said plurality of image forming devices and emitting a combined set of image rays.

59. The device of claim 55, wherein the projection lens is a zoom lens.

60. The device of claim 48, wherein the optical axis of the image rays incident onto the front projection screen and the optical axis of the image rays incident onto the rear projection screen are both substantially horizontal.

61. The device of claim 47, wherein the optical axis of the image rays incident onto the front projection screen is above the optical axis of the image rays incident onto the rear projection screen.

62. A projection display device capable of selectively operating in a front projection mode and a rear projection mode, comprising:
 a cabinet;
 a projector disposed in said cabinet and emitting image rays;
 a rear projection screen provided on said cabinet, for receiving image rays on a first surface facing the interior of said cabinet for display on an opposite, second surface in said rear projection mode;
 a front projection screen disposed outside said cabinet, for receiving the image rays on a third surface and for displaying the image on said third surface in said front projection mode; and
 selective light guide means for guiding image rays from said projector either to said rear projection screen or to said front projection screen including:
 a window formed in said cabinet;
 a mirror disposed in said cabinet and movable between a first position in which said mirror reflects said image rays to said rear projection screen, and a second position in which said mirror is retracted away from the optical path of the image rays to allow said image rays to pass through said window to said front projection screen;
 a mirror operating mechanism for causing said mirror to be in said first position when said rear projection mode is selected, and causing said mirror to be in said second position when said front projection mode is selected; and
 a mode selection switch for selection between said front projection mode and said rear projection mode;
 wherein said mirror operating means operates responsive to the mode selection switch.

63. The device of claim 62, further comprising an image direction control means for controlling the direction of the image as formed in said projector, depending on the projection mode, wherein said image direction control means is responsive to the mode selection switch for the control over the image direction.

64. The device of claim 62, wherein the mode selection switch is a manually operated switch mounted on the exterior of the cabinet.

65. The device of claim 62, wherein said rear projection screen forms a part of a wall of said cabinet.

66. The device of claim 62, wherein said cabinet is so formed as to block entry of substantially all environmental light into the cabinet at least in said rear projection mode.

67. The device of claim 62, further comprising focus adjusting means for adjusting the focus of the image rays onto either the rear projection screen or the front projection screen.

68. The device of claim 62, further comprising an image direction control means for controlling the direction of the image as formed in said projector, depending on the projection mode.

69. The device of claim 62, wherein the projector comprises an image forming device and a projection lens.

70. The device of claim 69, wherein the image forming device comprises a liquid crystal display panel.

71. The device of claim 69, wherein the image forming device comprises a cathode-ray tube.

72. The device of claim 69, wherein the image forming device comprises a plurality of image forming devices for respective colors, and a projection lens receiving image rays from all of said plurality of image forming devices and emitting a combined set of image rays.

73. The device of claim 69, wherein the projection lens is a zoom lens.

74. The device of claim 62, wherein the optical axis of the image rays incident onto the front projection screen and the optical axis of the image rays incident onto the rear projection screen are both substantially horizontal.

75. The device of claim 62, wherein the optical axis of the image rays incident onto the front projection screen is above the optical axis of the image rays incident onto the rear projection screen.

76. A projection display device capable of selectively operating in a front projection mode and a rear projection mode, comprising:
   a cabinet;
   a projector disposed in said cabinet and emitting image rays;
   a rear projection screen provided on said cabinet, for receiving image rays on its first surface facing the interior of said cabinet for display on its opposite, second surface in said rear projection mode;
   a front projection screen disposed outside said cabinet, for receiving the image rays on one of its surfaces for display on said one of the surfaces in said front projection mode;
   said rear projection screen being switchable between a translucent state for projection in said rear projection mode and a transparent state for projection in said front projection mode; and
   switching means for switching said rear projection screen between said translucent state and said transparent state.

77. The device of claim 76, further comprising a mode selection switch for selection between said front projection mode and said rear projection mode; wherein said switching means operates responsive to the mode selection switch.

78. The device of claim 77, further comprising an image direction control means for controlling the direction of the image as formed in said projector, depending on the projection mode, wherein said image direction control means is responsive to the mode selection switch for the control over the image direction.

79. The device of claim 78, wherein the mode selection switch is a manually operated switch mounted on the exterior of the cabinet.

80. The device of claim 76, wherein said rear projection screen comprises:
   a pair of parallel flat transparent members;
   transparent electrodes attached to said transparent members; and
   spherical capsules filled with a liquid crystal material, disposed between said transparent members.

81. The device of claim 76, wherein said rear projection screen forms a part of a wall of said cabinet.

82. The device of claim 76, wherein said cabinet is so formed as to block entry of substantially all environmental light into the cabinet at least in said rear projection mode.

83. The device of claim 76, further comprising focus adjusting means for adjusting the focus of the image rays onto either the rear projection screen or the front projection screen.

84. The device of claim 76, wherein the projector comprises an image forming device and a projection lens.

85. The device of claim 84, wherein the image forming device comprises a liquid crystal display panel.

86. The device of claim 84, wherein the image forming device comprises a cathode-ray tube.

87. The device of claim 84, wherein image forming device comprises a plurality of image forming devices for respective colors, and a projection lens receiving image rays from all of said plurality of image forming devices and emitting a combined set of image rays.

88. The device of claim 84, wherein the projection lens is a zoom lens.

89. The device of claim 76, wherein the optical axis of the image rays incident on the front projection screen is substantially horizontal.

* * * * *